(12) United States Patent
Imaoku et al.

(10) Patent No.: US 8,858,008 B2
(45) Date of Patent: Oct. 14, 2014

(54) DISPLAY DEVICE

(75) Inventors: Takao Imaoku, Osaka (JP); Takatomo Yoshioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 58 days.

(21) Appl. No.: 13/880,790

(22) PCT Filed: Oct. 24, 2011

(86) PCT No.: PCT/JP2011/074451
§ 371 (c)(1),
(2), (4) Date: Apr. 22, 2013

(87) PCT Pub. No.: WO2012/057089
PCT Pub. Date: May 3, 2012

(65) Prior Publication Data
US 2013/0208450 A1    Aug. 15, 2013

(30) Foreign Application Priority Data

Oct. 29, 2010    (JP) ................................ 2010-244566

(51) Int. Cl.
*G09F 13/04*    (2006.01)
*G06F 9/35*    (2006.01)
*G02F 1/1335*    (2006.01)
*G02F 1/1333*    (2006.01)

(52) U.S. Cl.
CPC    *G09F 13/0413* (2013.01); *G02F 2001/133628* (2013.01); *G02F 2201/54* (2013.01); *G02F 2001/133314* (2013.01); *G02F 1/133385* (2013.01); *G06F 9/35* (2013.01)
USPC ......................................... 362/97.1; 362/633

(58) Field of Classification Search
USPC ................................... 362/97.1, 633; 349/62
See application file for complete search history.

(56) References Cited

U.S. PATENT DOCUMENTS

| 7,896,513 | B2 * | 3/2011 | Takata et al. ................. 362/97.1 |
| 8,384,845 | B2 * | 2/2013 | Sekiguchi et al. ............... 349/62 |
| 8,579,493 | B2 * | 11/2013 | Kawabata et al. ............ 362/633 |
| 2009/0103282 | A1 * | 4/2009 | Itaya ........................... 362/97.1 |

FOREIGN PATENT DOCUMENTS

JP    2009-128394 A    6/2009

OTHER PUBLICATIONS

Official Communication issued in International Patent Application No. PCT/JP2011/074451, mailed on Dec. 6, 2011.

* cited by examiner

*Primary Examiner* — Mary Ellen Bowman
(74) *Attorney, Agent, or Firm* — Keating & Bennett, LLP

(57) ABSTRACT

A display panel (10) of a display device (1) is sandwiched between a chassis (31) and a bezel (20). The bezel (20) and a contact part of the chassis (31), which contact part is in contact with the display panel (10), are made of materials having identical thermal expansion coefficients. A bottom wall (32) of the chassis (31) is made of a material having a thermal expansion coefficient higher than those of the bezel (20) and the contact part.

14 Claims, 9 Drawing Sheets

(a)

(b)

(c)

DISPLAY DEVICE

TECHNICAL FIELD

The present invention relates to a display device including a non-luminous display panel, such as a liquid crystal display device.

BACKGROUND ART

Among various display devices, a liquid crystal display device is advantageous in that the liquid crystal display device is thin and lightweight and consumes less electric power. Therefore, the liquid crystal display device is used as a small-sized display device such as a display section of a mobile phone, and also as a display device of a large-sized TV (television set) and the like.

Unlike a self-luminous panel such as a CRT (cathode ray tube) and a plasma display panel, a liquid crystal panel does not emit light by itself. Therefore, the liquid crystal display device with high luminance generally displays an image by use of light from a backlight unit provided on a back side of the liquid crystal panel.

The backlight unit includes (i) light sources, referred to as backlight, for irradiating the liquid crystal panel with light and (ii) a chassis for holding the light sources. The backlight unit is configured such that the light sources are provided on the chassis. Therefore, the chassis is required to have strength to some extent.

In addition to an original function of holding the light sources as described above, the chassis has a function of preventing occurrence of uneven luminance due to external light entering the liquid crystal panel so as to suppress deterioration in display quality.

In view of this, Patent Literature 1 discloses a technique of employing a cold-rolled copper plate for the chassis and forming the chassis, with a box shape, having walls extending upwards from a periphery of the chassis by bending the periphery of the chassis.

CITATION LIST

Patent Literature 1

Japanese Patent Application Publication, Tokukai, No. 2009-128394 A (Publication Date: Jun. 11, 2009)

SUMMARY OF INVENTION

Technical Problem

However, the chassis of Patent Literature 1 does not have a sufficient heat radiation property. Therefore, in a case where the chassis of Patent Literature 1 is employed for the backlight unit, unstable operation may be caused because the backlight unit does not have a sufficient heat radiation property.

In recent years, a digital signage has attracted attention as one of use application of a display device. In a case where the display device such as the liquid crystal display device is employed for the digital signage which stays out in the sun, it is necessary for the backlight unit to emit light having a sufficiently high luminance of level so that visible display is carried out. This may cause unstable operation due to heat generated by the backlight unit.

The present invention has been made in view of the above problems, and objects of the present invention are to increase a heat radiation property of a backlight unit and provide a display device having high display quality.

Solution to Problem

In order to attain the above object, a display device in accordance with the present invention includes: (I) a non-luminous display panel for displaying an image; (II) a backlight unit, provided on a back side of the display panel, which includes (i) a chassis, with a box shape, having a bottom wall and a side wall and (ii) a light source, provided on the bottom wall of the chassis, for irradiating the display panel with light; and (III) a bezel, provided on a front side of the display panel, which has a frame shape, the display panel being sandwiched between the chassis and the bezel, the bezel and a contact part of the chassis, which contact part is in contact with the display panel, being made of materials having identical thermal expansion coefficients, the bottom wall of the chassis being made of a material having a thermal expansion coefficient higher than those of the bezel and the contact part.

In a case where (i) the display panel is fixed by two housings each having a different thermal expansion coefficient, that is, by the bezel and the chassis each having a different thermal expansion coefficient and (ii) a temperature of the entire display device rises in response to the light sources turning on, the display panel is under stress due to distortion such as warpage and/or bending of the housings caused by generated heat, depending on the temperature. As a result, the display panel may be damaged. Furthermore, such stress of heat may bring about a deterioration in display quality of the display panel, and entrance of external light into the display panel, caused by distorted housings, may bring about another deterioration in the display quality.

However, in a case where the bezel and the chassis are made of identical materials, that is, materials having identical thermal expansion coefficients, it becomes impossible to hold and protect the display panel while increasing its heat radiation property.

Further, in a case where the entire chassis is integrally made of a single material, the following problem arises. That is, when warpage and/or bending occur in the chassis due to generated heat, such warpage and/or bending is easily conveyed to a light source holding member for holding light sources. This may cause uneven luminance in a display section.

On the contrary, according to the above configuration, the bezel and the contact part of the chassis which contact part is in contact with the display panel are made of materials having identical thermal expansion coefficients. Therefore, it is possible to cause the bezel and the contact part of the chassis which contact part is in contact with the display panel to function to protect the display panel so as to prevent the display panel from being damaged.

On the other hand, the bottom wall of the chassis, where heat sources such as the light sources and the like are provided, is made of a material having a thermal expansion coefficient higher than those of the bezel and the contact part of the chassis which contact part is in contact with the display panel. Therefore, it is possible to cause the bottom wall of the chassis to function to increase the heat radiation property so as to efficiently radiate heat generated by such heat sources.

Therefore, it is possible to hold and protect the display panel while increasing its heat radiation property.

Note here that, as described above, it is obviously possible to increase the heat radiation property as compared with a case where the entire chassis is made of an identical material, if the material of the bottom wall of the chassis has a thermal expansion coefficient even a little higher than those of the bezel and the contact part of the chassis which contact part is in contact with the display panel.

Further, the bottom wall of the chassis and the contact part of the chassis which contact part is in contact with the display panel are made of different materials. This allows uneven luminance to be suppressed as described earlier.

Furthermore, the bezel and the contact part of the chassis which contact part is in contact with the display panel are made of materials having identical thermal expansion coefficients. Therefore, deterioration in display quality as described earlier does not occur.

Moreover, according to the above configuration, because the chassis has a box-shape and has a side wall as described above, external light does not enter the display panel through a back surface or a periphery of the chassis. Therefore, it is possible to prevent uneven luminance due to entrance of external light into the display panel, and suppress a deterioration in display quality of the display panel.

Therefore, according to the above configuration, it is possible to increase a heat radiation property of a backlight unit and provide a display device having high display quality.

Advantageous Effects of Invention

According to the present invention, the bezel and the contact part of the chassis which contact part is in contact with the display panel are made of materials having identical thermal expansion coefficients. The bottom wall of the chassis is made of a material having a thermal expansion coefficient higher than those of the bezel and the contact part of the chassis which contact part is in contact with the display panel. Therefore, it is possible to devise a measure to improve the heat radiation property by the bottom wall of the chassis. Further, it is not necessary for the bezel and the contact part of the chassis which contact part is in contact with the display panel to be made of materials having high thermal expansion coefficients in consideration of the heat radiation property. This allows an increase in holding strength of the display panel. Therefore, it is possible to hold and protect the display panel while increasing the heat radiation property of the display panel.

Further, it is possible to suppress occurrence of uneven luminance because the bottom wall of the chassis and the contact part of the chassis which contact part is in contact with the display panel are made of different materials.

Furthermore, the bezel and the contact part of the chassis which contact part is in contact with the display panel are made of materials having identical thermal expansion coefficients. This allows the display panel to be prevented from being damaged and allows display quality to be prevented from deteriorating.

DESCRIPTION OF EMBODIMENTS

The following description will discuss embodiments of the present invention in detail.

Embodiment 1

The following description will discuss Embodiment 1 of the present invention with reference to FIGS. 1 through 7.

First, an overall configuration of a display device in accordance with the present invention will be described below.

<Overall Configuration of Display Device>

Figure 1:
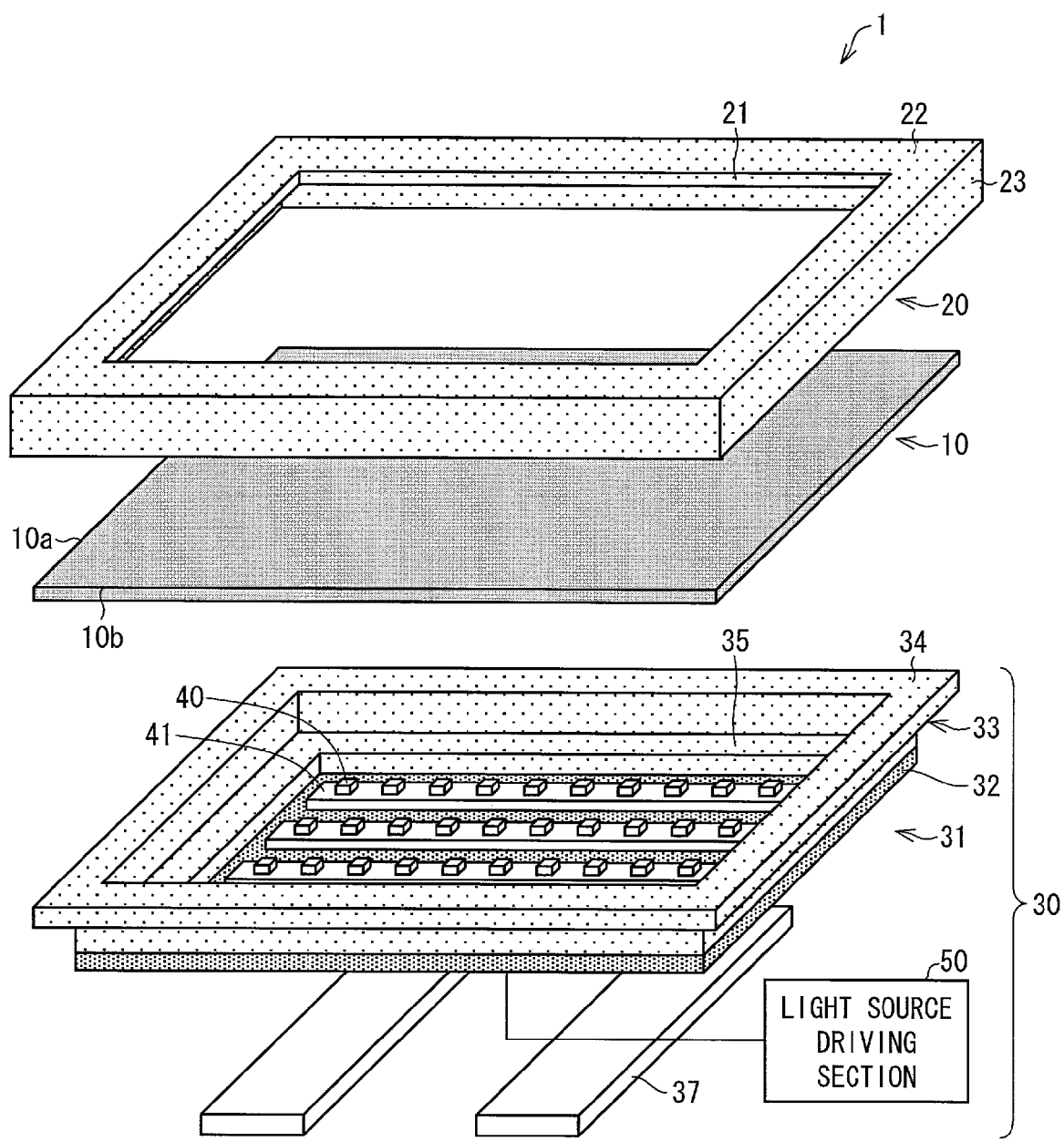
FIG. 1 is an exploded perspective view schematically illustrating a configuration of a display device in accordance with Embodiment 1 of the present invention.
Figure 2:
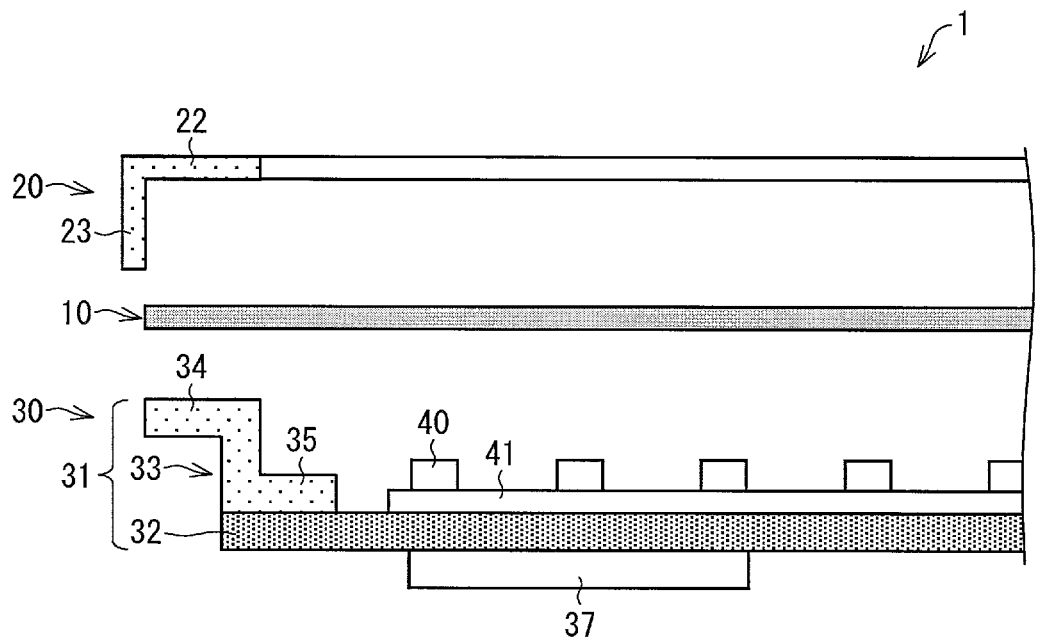
FIG. 2 is an exploded cross-sectional view schematically illustrating a configuration of a main part of the display device in accordance with Embodiment 1 of the present invention.

FIG. 1 is an exploded perspective view schematically illustrating a configuration of a display device in accordance with Embodiment 1. FIG. 2 is an exploded cross-sectional view schematically illustrating a configuration of a main part of the display device in accordance with Embodiment 1.

As illustrated in FIGS. 1 and 2, a display device 1 in accordance with Embodiment 1 includes a display panel 10 for displaying an image, a bezel 20, and a backlight unit 30 (backlight device).

The display device 1 is configured such that the display panel 10 is sandwiched between the bezel 20 and the backlight unit 30.

<Configuration of Display Panel 10>

The display panel 10 is a non-luminous display panel and functions to display an image by receiving light from the backlight unit 3.

The display panel 10 is not limited to a particular configuration, provided that the display panel 10 is a non-luminous display panel. Any of various known non-luminous display panels can be used as the display panel 10. Therefore, no detailed description and drawing of the display panel 2 will be given.

The display panel 10 includes (a) an active matrix substrate on which switching elements such as TFTs (Thin Film Transistors) are provided, (b) a counter substrate, such as a color filter substrate, which faces the active matrix substrate, and (c) a non-luminous display medium layer which is (i) sealed by a sealing material between the active matrix substrate and the counter substrate and (ii) subjected to optical modulation in response to an applied electric filed.

Examples of such optical modulation include a change in alignment direction, a change in refractive index, and a change in optical anisotropy.

A typical example of the non-luminous display medium layer is a liquid crystal layer. Note, however, that the non-luminous display medium layer is not limited to such. Examples of the non-luminous display medium layer, other than the liquid crystal layer, include a layer made of any of various organic materials or any of inorganic materials which layer brings about Pockels effect or Kerr effect. Note that examples of such a layer encompass a dielectric liquid layer containing polar molecules in an isotropic phase state, a layer made of an organic solid material such as hexamine, and a PLZT (metal oxide prepared by adding lanthanum to a solid solution of lead zirconate and lead titanate) layer.

That is, the display device 1 can be (i) a liquid crystal display device in which a liquid crystal panel is employed as the display panel 10 or (ii) a non-luminous display device, other than the liquid crystal display device, such as a display device using Pockels effect or Kerr effect.

The display panel 10 has a configuration in which a plurality of pixels are arranged in a plurality of rows and a plurality of columns, that is, in a matrix manner. Typically, for example, red pixels, green pixels, and blue pixels are employed as the plurality of pixels. Note that a color display picture element, made up of a red pixel, a green pixel, and a blue pixel, functions as a display unit which allows for any color.

Note that a color display picture element can be made up of a red pixel, a green pixel, a blue pixel, and another pixel (for example, a yellow pixel). Alternatively, a color display picture element can be made up of a red pixel, a green pixel, a blue pixel, and, for example, a white pixel. This makes it possible to efficiently increase luminance.

<Structure of Bezel 20>

The bezel 20 is provided on a front side of the display panel 10, that is, on a display surface side of the display panel 10.

The bezel 20 is a frame-shaped member and has an opening 21 in an area corresponding to a display area of the display panel 10. More specifically, the bezel 20 is a box-shaped member and has (a) no bottom wall and (b) a top wall 22 which partly has an opening.

In other words, the bezel 20 of Embodiment 1 has (i) the opening 21, (ii) the top wall 22 which covers front side edges of the display panel 10 and which functions as a top surface cover, and (iii) a side wall 23 which is provided so as to extend downward from edges of the top wall 22 and which functions as side surface covers.

As illustrated in FIGS. 1 and 2, the bezel 20 is provided so as to surround and cover four end parts of the display panel 10, more specifically, so as to surround and cover the front side edges and side surfaces of the display panel 10.

With the configuration, the bezel 20 holds and fixes the display panel 10, while protecting the display panel 10.

Note that the bezel 20 can be also used as an exterior of the display device 1. The bezel 20 can be employed as an exterior on a front side of the display panel 10, in a case where the display panel 10 is provided between (inside of) (i) a front cabinet (a first housing (not illustrated)) provided as an exterior on the front side of the display panel 10 and (ii) a rear cabinet (a second housing (not illustrated)) provided as an exterior on a back side of the display panel 10.

<Overall Configuration of Backlight Unit 30>

As illustrated in FIGS. 1 and 2, the backlight unit 30, provided on the back side of the display panel 10, emits light from behind the display panel 10.

The backlight unit 30 includes (i) a chassis 31 (backlight chassis) provided on the back side of the display panel 10, (ii) light sources 40, provided on a bottom wall 32 of the chassis 31, for irradiating the display panel 10 with light, and (iii) a light source driving section 50 (light source controlling section) for controlling the light sources 40.

The following description will first discuss how each part of the backlight unit 30 is configured.

<Structure of Chassis 31>

The chassis 31 is a box-shaped container and has (i) the bottom wall 32 and (ii) a side wall 33 which is provided so as to extend upwards from edges of the bottom wall 32. A flange part 34 is provided so as to project outwards from one end of the side wall 33 in parallel to the bottom wall 32. A connecting part 35 for connecting (joining) the side wall 33 to the bottom wall 32 is provided so as to project inwards (toward an area surrounded by the side wall 33) from the other end of the side wall 33 in parallel to the bottom wall 32.

The bottom wall 32 is provided in parallel to the display panel 10. When the light sources 40 is attached to the bottom wall 32 as described above, the bottom wall 32 functions as a light source holder (light source holding member). The flange part 34 is provided so as to project outwards in parallel to the display panel 10. Since the flange part 34 thus supports edges on a back side of the display panel 10, the flange part 34 functions as a panel holder (display panel holding member). This allows the chassis 31 to function as both the light source holder and the panel holder.

According to Embodiment 1, since the chassis 31 has a box-shape and has the side wall 33 as described above, no external light enters the display panel 10 through the back surface or the periphery of the chassis 31. This allows uneven luminance, due to the external light entering the display panel 10, to be prevented from occurring, and ultimately allows deterioration in display quality to be suppressed.

Particularly, the chassis 31 is provided so as to support the edges on the back side of the display panel 10 and the bezel 20 is provided so as to surround the edges on the front side of and the side walls of the display panel 10. This allows (i) a protective function of the display panel 10 to become high and (ii) external light to be surely prevented from entering the display panel 10.

Furthermore, the side wall 33 of the chassis 31 has the flange part 34. It is therefore possible to fix the display panel 10 while sandwiching the display panel 10 between the flange part 34 and the bezel 20. This allows the display panel 10 to be stably held.

According to Embodiment 1, the bottom wall 32 of the chassis 31 is made of a material different from the side wall 33. Note that a material of the chassis 31 will be later described in detail when the bezel 20 is described.

The bezel 20 and the chassis 31 are fixed to each other with the use of screws or other fixing members.

The display panel 10 is held and fixed by being sandwiched between the bezel 20 and the flange part 34 of the side wall 33 of the chassis 31.

Note that a reinforcing member 37 (reinforcing board, diagonal brace) is provided, if necessary, on an outer surface side (on a back side) of the bottom wall 32 of the chassis 31, that is, on a back surface side of the bottom wall 32 of the chassis 31.

It is possible to increase a strength of the bottom wall 32 by thus providing, on the back surface of the bottom wall of the chassis 31, the reinforcing member 37 for reinforcing the bottom wall 32 of the chassis 31. This allows an increase in strength of the entire chassis 31, and also allows warpage and/or bending of the chassis 31 itself to be corrected or suppressed.

Note that the reinforcing member 37 is not limited to a particular shape, a particular number, and a particular arrangement, provided that the reinforcing member 37 is capable of suppressing warpage and/or bending of the chassis 31 itself.

According to an example configuration illustrated in FIG. 1, two reinforce members 37 (i) are arranged in a direction parallel to long sides of the display panel 10 and (ii) extend in a direction parallel to short sides 10a of the display panel 10. More specifically, the two reinforcing members 37 are provided so as to be (i) away, by one fourth of the long side 10b, from respective ends of the long sides 10b of the display panel 10 and (ii) in parallel to the short sides 10a of the display panel 10.

It is possible to suppress warpage and/or bending of the chassis 31 itself, by thus providing the reinforce members 37. This allows uneven luminance and uneven display to be suppressed and prevented more surely, and ultimately allows a decrease in display quality to be suppressed and prevented, thereby obtaining high display quality.

<Structure of Light Source Driving Section 50>

Figure 3:
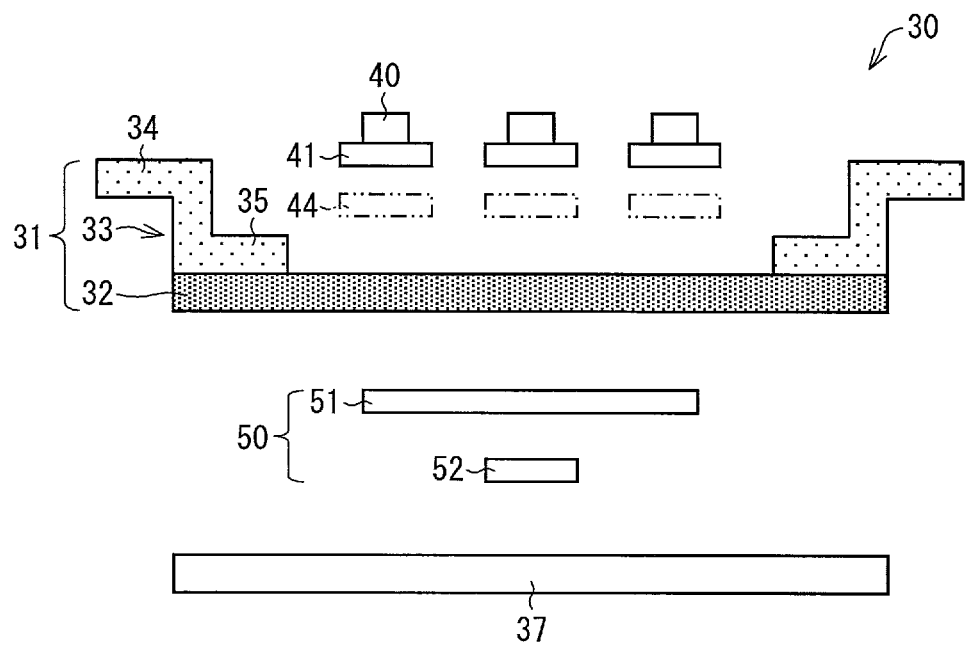
FIG. 3 is an exploded perspective view schematically illustrating a configuration of a main part of a backlight unit illustrated in FIG. 1.

FIG. 3 is an exploded perspective view schematically illustrating a configuration of a main part of the backlight unit 30.

The light source driving section 50 is provided on the back surface side of the chassis 31, that is, on an outside surface (back side) of the bottom wall 32 of the chassis 31. The bottom wall 32 of the chassis 31 has an opening (not illustrated). Through the opening, the light source 40 is electrically connected with the light source driving section 50.

The light source driving section 50 includes, for example, a light source control circuit 51 and a light source control substrate 52 for supporting the light source control circuit 51. The light source control circuit 51 is provided in a form of an integrated chip. The light source control substrate 52 includes, for example, an insulating substrate (not illustrated), such as FR4 (Flame Retardant Type 4), on which wiring (not illustrated) is provided.

The backlight unit 30 is preferably a backlight device capable of controlling a luminance distribution, more preferably a backlight device in which area active drive is carried out.

The light source driving section 50 can be provided (i) on a front side of the chassis 31 (for example, on the bottom wall 32) or (ii) on the side wall 33 of the chassis 31.

Note, however, that, in a case where the light source driving section 50 is provided on the bottom wall 32 of the chassis 31, it is not possible to provide the light sources 40 in an area covered by the light source driving section 50. This may cause uneven luminance. In a case where the light source driving section 50 is provided on the side wall 33 of the chassis 31, a picture-frame region enlarges. In view of the circumstances, it is preferable to provide the light source driving section 50 on the back surface side of the chassis 31. This allows uneven luminance of the light sources 40 and enlargement of the picture-frame region to be suppressed.

<Light Source 40>

For example, LEDs (Light Emitting Diode) are suitably employed as the light sources 40. Note that CCFLs (Cold Cathode Fluorescent Lamp) can be employed as the light sources 40. However, in a case where the LEDs are employed as the light sources 40, it is possible to suppress electric power consumption and improve a contrast ratio. Embodiment 1 will discuss below an example case in which the LEDs are employed as the light sources 40.

LED substrates 41 (light source holding members), used to attach the LEDs serving as the light sources 40, are attached onto the bottom wall 32 of the chassis 31. The LEDs are attached to the chassis 31 via the LED substrates 41.

Figure 4:
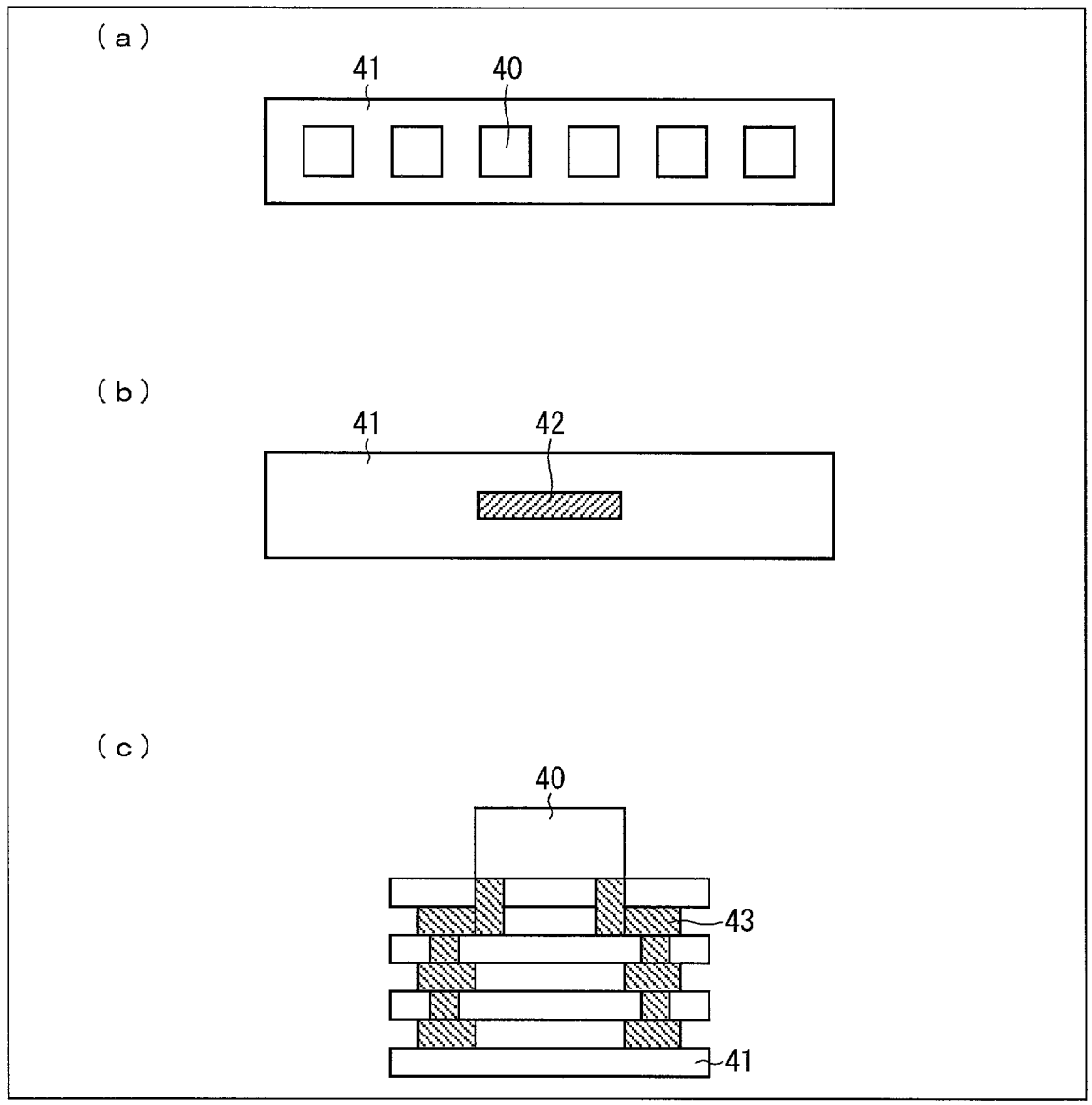
FIG. 4 (a) through (c) of FIG. 4 are views each schematically illustrating a configuration of an LED substrate onto which LEDs, serving as light sources, are attached. (a) of FIG. 4 is a plan view, (b) of FIG. 4 is a bottom view, and (c) of FIG. 4 is a cross-sectional view.

(a) through (c) of FIG. 4 are views each schematically illustrating a configuration of the LED substrate 41 onto which the LEDs, serving as the light sources 40, are attached. (a) of FIG. 4 is a plan view, (b) of FIG. 4 is a bottom view, and (c) of FIG. 4 is a cross-sectional view.

As illustrated in (a) of FIG. 4, a plurality of LEDs are provided on a single LED substrate 41.

As illustrated in (b) of FIG. 4, a connecting part 42 for electrically connecting the plurality of LEDs, serving as the light sources 40, with the light source driving section 50 is provided on a back surface of the one LED substrate 41. The connecting part 42 is designed to have a size which matches size of the foregoing opening (not illustrated) of the bottom wall 32 of the chassis 31.

In a case where the LED substrate 41 is attached onto the bottom wall 32 of the chassis 31, the connecting part 42 projects toward a back side of the chassis 31 through the opening of the bottom wall 32 of the chassis 31. This allows the connecting part 42 to be connected with the light source control substrate 52 of the light source driving section 50. As a result, the light sources 40 are electrically connected with the light source control circuit 51 via the connecting part 42 and the light source control substrate 52.

As illustrated in (c) of FIG. 4, wiring 43 is provided between the light sources 40 and the LED substrate 41. Since the LED substrate 41 has a multi-layer structure ((c) of FIG. 4), it is possible to increase the width of the wiring 43 without reducing circuits to be provided on the LED substrate 41. This allows a large amount of electric current to be supplied to the light sources 40. Note that wiring can be further formed on the back surface of the LED substrate 41. Note also that it is preferable that white coating material be coated on at least an area on a top surface of the LED substrate 41 in which area no light source 40 is provided.

As described above, the light sources 40 are electrically connected with the light source control circuit 51 via the light source control substrate 52. Note that Embodiment 1 has described the example case where the LEDs, serving as the light sources 40, are attached onto the bottom wall 32 of the chassis 31 via the LED substrates 41. Note, however, that Embodiment 1 is not limited to such. For example, the light sources 40 can be attached onto the bottom wall 32 of the chassis 31 without being attached onto the LED substrate 41.

Note that the chassis 31 to which the light sources 40 are attached is covered by, for example, a cover member (not illustrated).

Note also that an insulating sheet 44 can be provided between the bottom wall 32 of the chassis 31 and the respective LED substrates 41 if necessary (see two-dot chain lines in FIG. 3).

Note that Embodiment 1 has described the direct backlight unit 30 in which the plurality of light sources 40 are arranged behind the display panel 10 so as to directly irradiate the display panel 10 with light. However, Embodiment 1 is not limited to such. The backlight unit 30 can be a direct backlight unit or an edge light unit.

In a case where an edge light unit is employed, a light guide plate is further provided behind the display panel 10 and the light sources 40 are provided on end surfaces (side end parts) of the light guide plate. With the configuration, light emitted from the light sources 40 is reflected from the light guide plate, and indirectly evenly irradiates the display panel 10 with light.

However, in a case where the backlight unit 30 is an edge light unit, its heat quantity is small as compared with a direct backlight unit. Therefore, the display device 1 of Embodiment 1 brings about more efficient effect in a case where a direct backlight unit is employed.

<Materials of Bezel 20 and Chassis 31>

According to Embodiment 1, the bezel 20 and the side wall 33 of the chassis 31 are made of materials having identical thermal expansion coefficients. In addition, the bottom wall 32 of the chassis 31 is made of a material having a thermal expansion coefficient higher than those of the bezel 20 and the chassis 31.

This is because of the following reasons.

In a case where (i) the display panel 10 is fixed while being sandwiched between two housings each having a different thermal expansion coefficient, that is, by the bezel and the chassis 31 each having a different thermal expansion coefficient and (ii) a temperature of the entire display device 1 rises in response to the light sources 40 turning on, the display panel 10 is under stress due to distortion such as warpage and/or bending of the housings caused by generated heat, depending on the temperature. As a result, the display panel 10 may be damaged. Furthermore, such stress of heat may bring about a deterioration in display quality of the display panel 10, and entrance of external light into the display panel 10, caused by distorted housings, may bring about another deterioration in the display quality.

In view of the circumstances, the bezel 20 and the chassis 31, between which the display panel 10 is sandwiched, are made of materials having identical thermal expansion coefficients. This allows the display panel 10 to be hardly subjected to such distortion and/or stress, even in a case where a temperature of the housings rises. In consequence, it is possible to (i) protect the display panel 10 so as to prevent the display panel 10 from being damaged, and (ii) prevent the display quality from being deteriorated due to stress and/or distortion caused by generated heat.

The chassis 31 thus functions to (a) hold and fix the light sources 40 and the display panel 10, (b) prevent uneven luminance due to entrance of external light into the display panel 10, and (c) suppress a decrease in display quality of the display panel 10.

Note that the bezel 20 also functions to (i) hold and fix the display panel 10 and (ii) protect the display panel 10.

In order to function as above, the bezel 20 and the chassis 31 are required to be rigid enough to prevent the display panel 10 from being damaged.

Further, in recent years, an entire display device has been required to be thinner and lighter in weight as a display panel becomes larger.

In recent years, a digital signage has attracted attention as one of use application of a display device. In a case where a display device, such as a liquid crystal display device, is employed as a digital signage which stays out in the sun, it is necessary to for a backlight unit to emit light having a sufficiently high luminance of level so that visible display is carried out.

In a case where a display device is employed as a display section of a digital signage, especially, a large outdoor digital signage, a large electric current passes through light sources and a light source driving section. In this case, heat generated by a backlight unit may cause unstable operations of the light sources and the light source driving section.

For example, in a case where a liquid crystal display device is employed as a general TV device, a backlight unit needs to emit light having luminance of approximately 500 $cd/m^2$. On the other hand, in a case where a liquid crystal display device is employed as a digital signage for outdoor use, a backlight unit needs to emit light having luminance of 1000 $cd/m^2$ or more (more preferably approximately 2500 $cd/m^2$).

For example, in a case where a 52-inch liquid crystal display device is employed as a general TV device, a backlight unit emits light having luminance of approximately 450 $cd/m^2$. In this case, the whole electric power of light sources and a light source driving section is approximately 100 W, and therefore electric current of approximately 1.0 A passes through the light sources and the light source driving section.

On the other hand, in a case where a 52-inch liquid crystal display device is employed, for example, as a display of a digital signage, a backlight unit emits light having luminance of approximately 2000 $cd/m^2$. In this case, the whole electric power of light sources and light source driving section is approximately 400 W, and therefore electric current of approximately 9.0 A passes through the light sources and the light source driving section. In a case where a large electric current thus passes, an improvement is further required in heat radiation property of the backlight unit.

In view of the circumstances, in a case where a high luminance backlight module is employed in a display device such as a digital signage so as to particularly increase visibility, it is necessary to increase a heat radiation property of a housing, as compared with that of a general TV (Television) set.

While a light source driving section is driving light sources, heat is generated by the light source driving section. Note that a quantity of heat generated by a light source driving section is generally larger than that generated by the light sources, and a temperature of the light source driving section is therefore higher than that of the light sources.

The following measure to improve the heat radiation property will be devised to meet the circumstances. Specifically, a material, having a high thermal expansion coefficient and excellent thermal conduction property (e.g. aluminum), is to be employed as the chassis 31 where heat sources, such as the light sources 40, the LED substrate 41, and the light source driving section 50, are provided.

However, if the entire chassis 31 is integrally made of a single material, the following problem may arise. That is, in a case where warpage and/or bending occur in the chassis 31 due to generated heat, such warpage and/or bending are conveyed to the LED substrate 41, and this may cause uneven luminance in a display area.

Such uneven luminance also greatly depends on supplied electric power, i.e., a quantity of heat generated by the backlight unit 30. Therefore, even though electric power, supplied to a display device such as a TV set, may cause no problem, a large electric power, supplied to a display device such as an outdoor display, is more likely to cause uneven luminance.

Particularly, in a case where (i) the entire chassis 31 is made of a material having a high thermal expansion coefficient so as to devise a measure to improve the heat radiation property as described above and (ii) warpage and/or bending occur in the chassis 31 due to generated heat, such warpage and/or bending is easily conveyed to the LED substrate 41.

In view of this, according to the present embodiment, the bezel 20 and the side wall 33 of the chassis 31 are made of materials having identical thermal expansion coefficients, and the bottom wall 32 of the chassis 31 is made of a material having a thermal expansion coefficient higher than those of the bezel 20 and the side wall 33 of the chassis 31 as described above.

This causes the bezel 20 and the side wall 33 of the chassis 31 to function to protect the display panel 10 so as to prevent the display panel 10 from being damaged, while causing the bottom wall 32 of the chassis 31, where the heat sources such as the light sources 40, the LED substrate 41, and the light source driving section 50 are to be provided, to function to increase the heat radiation property so as to efficiently dissipate heat generated by the heat sources.

That is, conventionally, (i) a bezel and a chassis have been generally made of identical materials and (ii) a bottom wall and a side wall of the chassis have been integral with each other and have been made of identical materials.

The conventional configuration, however, causes the following problems. Specifically, in a case where the bezel and the chassis are made of identical materials suitable for holding and protecting a display panel, enough heat radiation property cannot be secured. On the other hand, in a case where the bezel and the chassis are made of identical materials having a high heat radiation property, strength enough to hold and protect the display panel cannot be secured. In contrast, in a case where the bezel and the chassis are made of respective different materials, the foregoing problems arise. Specifically, the problems will occur that (i) the display panel is not sufficiently protected and (ii) a display quality, such as uneven luminance or uneven display, is deteriorated.

On the contrary, according to Embodiment 1, since the bottom wall 32 and the side wall 33 of the chassis 31 are made of respective different materials as described earlier, it is possible for the bottom wall 32 and the side wall 33 of the chassis 31 to function to radiate heat and to function to hold the display panel, respectively. It is therefore possible to use materials suitable for the respective functions of the bottom wall 32 and the side wall 33.

That is, according to Embodiment 1, the bottom wall 32 and the side wall 33 of the chassis 31 are made of respective different materials so as to carry out their respective functions as described above. This allows (i) an increase in heat radiation property of the bottom wall 32 of the chassis 31 where the heat sources are to be provided and (ii) a strength, sufficient to hold (keep holding) the display panel 10, to be secured. It follows that (a) even in a case where the display device 1 is employed as a display section of a digital signage, it is possible to maintain enough heat radiation property and (b) it is possible to prevent the display panel 10 from being damaged.

Especially, according to Embodiment 1, (i) the bottom wall 32 and the side wall 33 of the chassis 31 are made of respective different materials and (ii) the bezel 20 and the side wall 33 of the chassis 31, that is, holding parts (contact parts) of the display panel 10 are made of identical materials, it is possible to eliminate phenomena which adversely affect display quality such as uneven luminance and uneven display. As a result, it is possible to provide a display device having a high display quality.

Note in Embodiment 1 that materials of the bezel 20 and the chassis 31 are not limited to specific ones, provided that the materials can be converted into housings.

However, in recent years, an entire display device has been required to be thinner and lighter in weight as a display panel becomes larger.

In view of the circumstances, the bezel 20 and the chassis 31 are preferably made of respective metallic materials so as to secure sufficient light-shielding property and sufficient strength even in a case where the display device 1 is thinned. Among the metallic materials, iron and iron alloy (hereinafter, collectively referred to as iron materials) are preferable because (i) they have high specific tensile strengths, (ii) they can be molded by press work, and (iii) they have high productivity. Particularly, steel (iron and steel) is highly rigid, and, among steel, cold-rolled steel is highly rigid and excellent in press workability. Therefore, cold-rolled steel is particularly preferable.

The kind of steel is not limited to a particular one. Examples of the cold-rolled steel encompass SPCC (steel plate cold commercial) called common steel, SECC (electrogalvanized steel plate) prepared by electro-galvanizing cold-rolled steel, and SGCC (hot dip zincing steel plate) prepared by causing cold-rolled steel to be subjected to hot dip zincing.

Note that warpage and/or bending is (are) more likely to occur in the housings as thermal expansion coefficients become higher, depending on supplied electric power (an amount of heat generated by the backlight unit 30). Therefore, it is preferable to employ materials having low thermal expansion coefficients, particularly, metallic materials having low thermal expansion coefficients as the bezel 20 and the side wall 33 of the chassis 31 which are in contact with the display panel 10 and which are the holding parts of the display panel 10.

For example, a thermal expansion coefficient of iron in use environment is relatively low and falls within a range from $11.8 \times 10^{-6}$/K to $12.1 \times 10^{-6}$/K. Note that thermal expansion coefficients of the iron materials substantially remain unchanged. Also in terms of this point, the iron materials are preferably employed as materials of the bezel 20 and the side wall 33 of the chassis 31.

Similarly, the bottom wall 32 of the chassis 31 is preferably made of a metallic material, as a material capable of being processed to a housing, so as to secure sufficient light-shielding property and sufficient strength even in a case where the display device 1 is thinned.

As described above, it should be understood that the heat radiation property can be increased as compared with a case where the entire chassis 31 is made of a single material, if a material of which the bottom wall 32 of the chassis 31 is made has a thermal expansion coefficient even a little higher than those of the bezel 20 and the side wall 33 of the chassis 31. Furthermore, since the bottom wall 32 and the side wall 33 of the chassis 31 are made of different materials, it is possible to suppress occurrence of uneven luminance as described above.

As described above, it is possible to increase the heat radiation property by employing, as the bottom wall 32 of the chassis 31, a material having a thermal expansion coefficient higher than those of the bezel 20 and the side wall 33 of the chassis 31, as compared with a case where the entire chassis 31 is made of a single material. Note, however, that it will be difficult to secure enough heat radiation property, depending on a thermal expansion coefficient. This is especially true in a case where the display device 1 is employed as a digital signage.

In terms of an increase in the heat radiation property as compared with conventional cases so that the heat radiation property is sufficiently secured, it is preferable to employ, as the bottom wall 32 of the chasse 31, a material having a thermal expansion coefficient higher than that of iron, particularly, a metallic material having a thermal expansion coefficient higher than that of iron.

It is possible to hold and protect the display panel 10 while increasing the heat radiation property as compared with conventional cases, by employing, as the bottom wall 32 of the chassis 31, a material having a thermal expansion coefficient higher than that of iron, that is, by (i) employing, as the bottom wall 32 of the chassis 31, a material having a thermal expansion coefficient higher than that of iron and (ii) employing, as the bezel 20 and the side wall 33 of the chassis 31, materials having lower thermal expansion coefficients not higher than that of iron, preferably materials having thermal expansion coefficients identical to that of iron.

Examples of such a suitable material include stainless steel (SUS), such as aluminum (e.g. 5000 series), aluminum alloy, duralumin, and SUS 304, whose thermal expansion coefficient is higher than that of iron.

A thermal expansion coefficient of aluminum in the environment where the display device 1 is used generally falls within a range from $23.0 \times 10^{-6}$/K to $23.5 \times 10^{-6}$/K. A thermal expansion coefficient of aluminum alloy in the environment where the display device 1 is used is approximately $21.6 \times 10^{-6}$/K.

Further, a thermal expansion coefficient of duralumin in the environment where the display device 1 is used is generally $23.4 \times 10^{-6}$/K, and a thermal expansion coefficient of SUS 304 in the environment where the display device 1 is used is generally $17.3 \times 10^{-6}$/K.

Among such metallic materials, aluminum (e.g. 5000 series) and an aluminum alloy are preferable in view of the fact that they (i) are lightweight and inexpensive, (ii) have thermal expansion coefficients two times higher than that of iron, and (iii) are excel particularly in heat radiation property. A base material, such as an aluminum alloy which has been subjected to alumite treatment, that has an aluminum layer, on which a porous alumina layer or a porous alumina layer which has been subjected to sealing is formed, is especially preferable.

By thus employing, as the bottom wall 32 of the chassis 31, a material having a high thermal expansion coefficient, it is possible to obtain the chassis 31 which is excellent in thermal conductivity and heat radiation property. This allows an increase in heat radiation property of the backlight unit 30.

Figure 5:
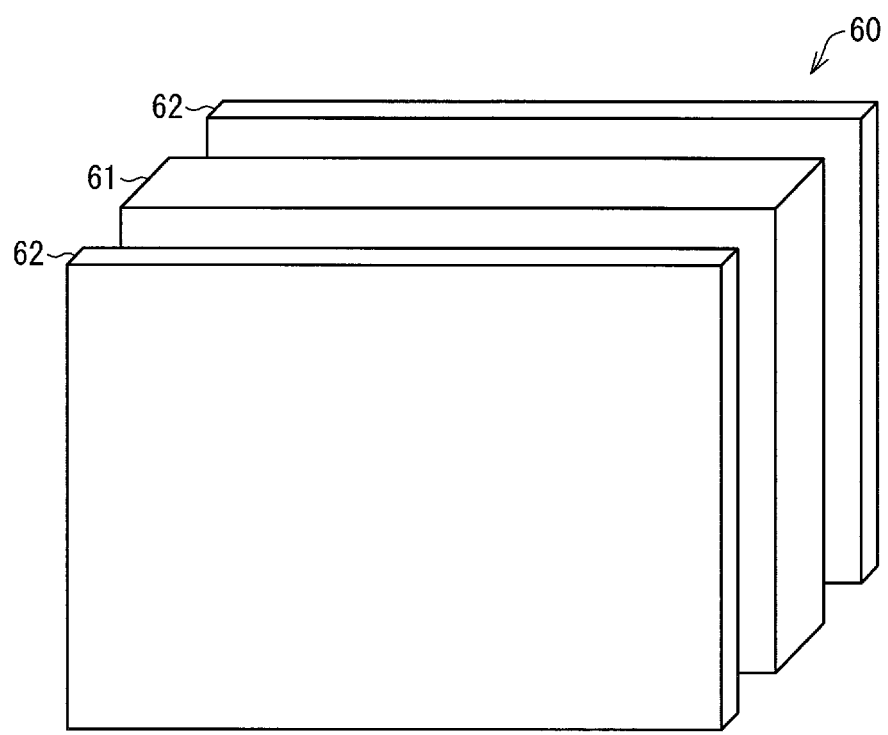
FIG. 5 is an exploded perspective view schematically illustrating an example configuration in which a base material includes an aluminum layer sandwiched between porous alumina layers.

In this case, by particularly employing, as the bottom wall 32 of the chassis 31, a base material 60, such as an aluminum alloy which has been subjected to alumite treatment, that includes an aluminum layer 61 sandwiched between porous alumina layers 62 as illustrated in FIG. 5, it is possible to obtain, at low cost, the chassis 31 which is excellent in heat conductivity and heat radiation property.

For example, the aluminum alloy, which has been subjected to alumite treatment, is lighter in weight than iron and is excellent in heat radiation property, while having significantly high hardness. This allows an improvement in heat radiation property and a reduction in weight of the display device 1, simultaneously. As the display panel 10 becomes larger, a greater effect is brought about.

The base material 60 will be described below in more detail.

<Configuration of Base Material 60>

FIG. 5 is an exploded perspective view schematically illustrating an example configuration in which the base material 60 includes the aluminum layer 61 sandwiched between porous alumina layers 62.

The base material 60 includes the porous alumina layers 62 and the aluminum layer 61 which is sandwiched between the porous alumina layers 62. Note that the porous alumina layer 62 can be one that is subjected to sealing or can be one that is not subjected to sealing.

The aluminum layer 61 is relatively high in thermal conductivity. The porous alumina layer 62 is a layer made of aluminum oxide ($Al_2O_3$), which is relatively high in thermal conductivity.

In view of strength, the thickness of the aluminum layer 61 is preferably 1.0 mm or more and, for example, 1.5 mm. The thickness of the porous alumina layer 62 is for example approximately 10 μm. Note that, as the porous alumina layer 62 becomes thicker, its heat radiation property increases, however, processing time and cost involved increase accordingly.

Note that, in Embodiment 1, (i) SECC with a plate thickness of, for example, 1.0 mm is employed as the bezel 20 and the side wall 33 of the chassis 31 and (ii) an aluminum alloy with a plate thickness of, for example, 1.6 mm is employed as the bottom wall 32 of the chassis 31. Note, however, that Embodiment 1 is not limited to such. No uneven luminance was observed, for example, even in a case where an aluminum alloy with a plate thickness of 1.2 mm was employed as the bottom wall 32 of the chassis 31.

Note that, in a case where the porous alumina layer 62 has a thickness of 10 μm as described above, its dielectric breakdown voltage is 540 V. In a case where the porous alumina layer 62 has a thickness of 6 μm, its dielectric breakdown voltage is 360 V.

It is possible to secure a sufficient dielectric strength of the bottom wall 32 of the chassis 31 to the respective LED substrates 41, in a case where the base material 60, in which the aluminum layer 61 is sandwiched between the porous alumina layers 62, is employed as the bottom wall 32 of the chassis 31.

In this case, it is therefore not necessary to provide an insulating sheet 44 between the bottom wall 32 of the chassis 31 and the respective LED substrates 41. An insulating sheet 44 can no doubt be provided between the bottom wall 32 of the chassis 31 and the respective LED substrates 41 if necessary, as has been previously described.

As described above, in a case where the base material 60, in which the aluminum layer 61 is sandwiched between the porous alumina layers 62, such as an aluminum alloy which has been subjected to alumite treatment, is employed as the bottom wall 32 of the chassis 31, it is possible to efficiently dissipate heat generated by the light sources 40, the LED substrates 41, and the light source driving circuit 50, each of which serves as a heat source. This is because of (i) thermal conductivity of aluminum and (ii) heat radiation property of a surface aluminum oxide layer ($Al_2O_3$, alumite layer).

While the light sources 40 are being turned on, heat is generated in response to an electric current supplied to the light sources 40. Heat, transferred to the bottom wall 32 of the chassis 31, is efficiently transferred to the entire aluminum layer 61 because the aluminum layer 61 is high in thermal conductivity, and is then efficiently radiated outside by the porous alumina layer 62 which is high in heat radiation. The chassis 31 allows heat generated by the backlight unit 30 to be efficiently radiated outside, and ultimately allows stable operation to be ensured.

Furthermore, while the light source driving section 50 is driving the light sources 40, heat is generated by the light source driving section 50. Note that, generally, (i) a quantity of heat generated by a light source diving section is generally larger than a quantity of heat generated by light sources and (ii) a temperature of the light source driving section is higher than that of the light sources, as described earlier.

The light source driving section 50 generates heat while being in operation, and then the heat is transferred to the bottom wall 32 of the chassis 31. In this case, the heat is efficiently transferred to the entire aluminum layer 61 because the aluminum layer 61 is high in thermal conductivity, and is then efficiently radiated outside by the porous alumina layer 62 which is high in heat emittance. This allows heat generated by the light source driving section 50 to be efficiently radiated outside by the chassis 31, and ultimately allows stable operation to be ensured.

Now, an attention is focused on a thermal radiation rate of each material. A thermal radiation rate of SECC is significantly low, i.e., less than 0.1. A thermal radiation rate of pure aluminum is 0.03, and an average thermal radiation rate of general aluminum is low, i.e., 0.14. On the other hand, an average thermal radiation rate of the base material 60 is high, i.e., approximately 0.78, depending on a thickness of the porous alumina layer 62. Note that a thermal radiation rate of aluminum oxide is 0.85.

Here, an attention is focused on thermal conductivity of the each material. Thermal conductivity of SECC is 53 W/mk. Thermal conductivity of pure aluminum is high, i.e., 236 W/mk, but does not have an enough strength. Thermal conductivity of general alumina is 29 W/mk. On the other hand, thermal conductivity of an aluminum base material employed as the aluminum layer 61 of the present embodiment is 120 W/mk.

It is preferable to employ, as the aluminum layer 61, a material which has a mechanical strength relatively higher than that of SECC. Tensile strength, proof strength, and tension of SECC are 350 N/mm$^2$, 213 N/mm$^2$, and 21%, respectively. In view of the circumstances, an aluminum alloy, whose tensile strength, resistance, and tension are for example 400 N/mm$^2$, 310 N/mm$^2$, and 12%, respectively, is preferably employed as the aluminum layer 61. Alternatively, an aluminum alloy of 5000 series can be employed as the aluminum layer 61. For example, an aluminum alloy whose tensile strength, resistance, and tension are 240 N/mm$^2$, 190 N/mm$^2$, and 12%, respectively, can be employed as the aluminum layer 61.

Note that, as described earlier, in a case where a material having a relatively high thermal expansion coefficient (e.g. an aluminum alloy) is employed as the bottom wall 32 of the chassis 31, it is desirable to thin the plate thickness of the bottom wall 32 in light of the heat radiation property of the bottom wall 32 and cost involved with the plate thickness.

In view of the circumstances, the bottom wall 32 of the chassis 31 is screwed to the side wall 33 of the chassis 31 so that an optical distance between the respective light sources 40 and the display panel 10 does not change, i.e., so that a distance between the respective LED substrates 41 and the display panel 10 does not change.

<Example 1 of Production of Base Material 60>

The following description will discuss an example method for producing a base material 60 in which an aluminum layer 61 is sandwiched between porous alumina layers 62.

First, an aluminum base material (an aluminum plate) which is 1.5 mm in thickness is prepared. The aluminum base material is one that is relatively high in rigidity. For example, aluminum purity of the aluminum base material is not less than 99.50 percent by mass and less than 99.99 percent by mass. The aluminum base material contains an impurity. The impurity is at least one element selected from the group consisting of Fe, Si, Cu, Mn, Zn, Ni, Ti, Pb, Sn, and Mg. The aluminum base material preferably contains Mg as the impurity. Such an aluminum base material is also referred to as aluminum alloy.

Next, the aluminum base material is subjected to anodization. The anodization is carried out by immersing the aluminum base material in an electrolytic solution. For example, the anodization is carried out by immersing the aluminum base material in a sulfuric acid aqueous solution (electrolytic solution) of a concentration of not less than 10 percent by mass and not more than 20 percent by mass and a bath temperature of not less than 20° C. and not more than 30° C., under the condition that (i) an electric current having an electric current density of not less than DC 1 A/dm$^2$ and not more than DC 2 A/dm$^2$ and (ii) a voltage of not less than 10 V and not more than 30 V are applied for a time period of not less than 10 minutes and not more than 30 minutes. This causes the aluminum layer 61, made of the aluminum base material, to be sandwiched between the porous alumina layers 62. Note that such anodization is also referred to as alumite treatment, and an aluminum oxide ($Al_2O_3$) layer formed by alumite treatment is also referred to as an alumite layer.

Note that an etching process can be further carried out after the anodization if necessary. The etching process allows fine openings, formed in the porous alumina layer 62 which has been subjected to the anodization, to become larger in diameter and depth. The etching process is carried out by employing, as an etchant, (i) phosphoric acid of 10 percent by mass, (ii) an aqueous solution of organic acid such as phosphoric acid, formic acid, acetic acid, or citric acid, or (iii) a mixed aqueous solution of chromium and phosphoric acid. Note that the above-mentioned anodization and the etching process can be repeated if necessary.

Thereafter, the porous alumina layer 62 is subjected to sealing, if necessary.

Note that the fine openings are formed in the porous alumina layer 62 which has been subjected to the anodization, as described above. In a case of omitting such sealing, it is possible to utilize a relatively large surface area of the porous alumina layer 62. This allows an increase in heat radiation effect of the porous alumina layer 62.

Particularly, in a case of forming fine openings which are small in diameter in the entire surface of the porous alumina layer 62, the surface area of the porous alumina layer 62 increases as compared with that of a porous alumina layer which has been subjected to general anodization, that is, an area exposed to the air increases. This allows an increase in the heat radiation effect due to thermal convection.

For example, it is preferable that (i) another porous alumina layer 62, which is used as what is called a mold (stamper) for preparing an anti-reflection material, is employed instead of the above porous alumina layer 62 and then (ii) a plurality of concave parts are formed on such another porous alumina layer 62. Each of the plurality of concave parts has a two-dimensional size of not less than 10 nm and less than 500 nm, when viewed in a direction of a normal line of the surface. Note that oxidation technically progresses due to the air even if the porous alumina layer 62 is not subjected to sealing.

<Sealing Process>

The sealing is carried out by use of, for example, stream under pressure or boiled water.

In a case where the sealing is carried out by use of steam under pressure, for example, a base material 60, which has not been subjected to sealing, is exposed to steam under several air pressures. Note that the base material 60 indicates an aluminum base material having a porous alumina layer 62 whose surface has not been subjected to sealing.

In a case where the sealing is carried out by use of boiled water, for example, a base material 60, which has not been subjected to sealing, is heated for tens of minutes with boiled water which is prepared so as to have approximately pH 5.5 to pH 6.5.

Note that, in either case, a sealing agent such as nickel acetate can be added.

<Example 2 of Production of Base Material 60>

Next, as another example method for producing a base material 60 in which an aluminum layer 61 is sandwiched between porous alumna layers 62, the following description will discuss a method for forming, in the porous alumina layer 62, concave parts each of which is different in size.

Figure 6:
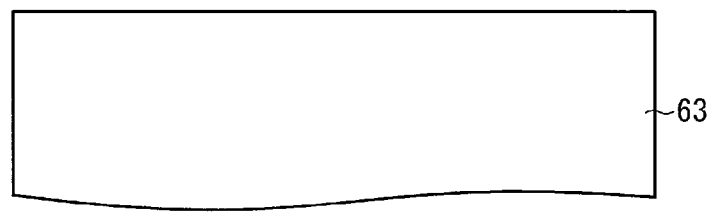
FIG. 6 (a) through (c) of FIG. 6 are cross-sectional views illustrating, in order of step, how to produce a main part of the base material in which the porous alumina layer, having concave parts each of which is different in size, is formed on the aluminum layer.
Figure 6:
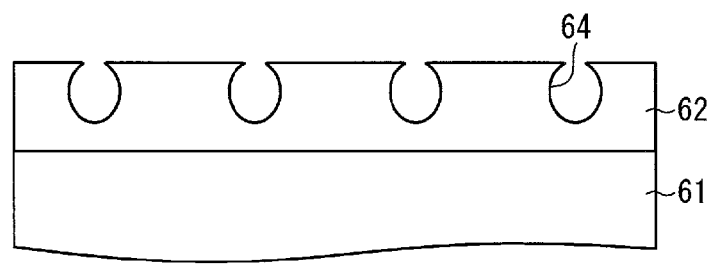
Figure 6:
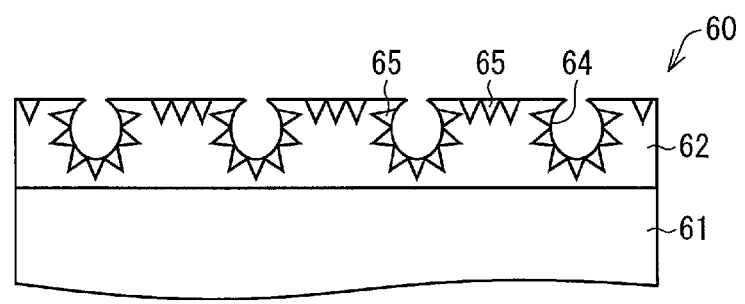

(a) through (c) of FIG. 6 are cross-sectional views illustrating, in order of step, how to produce a main part of the base material 60 in which the porous alumina layer 62, having concave parts each of which is different in size, is formed on the aluminum layer 61.

In a case where the concave parts each of which is different in size are formed in the porous alumina layer 62, anodization and etching are carried out with respect to an aluminum base material which contains at least one element selected from the group consisting of, for example, Mn, Mg, and Fe. Alternatively, the concave parts each of which is different in size can be formed by causing an aluminum base material to be subjected to cathode electrolysis before anodization.

Specifically, an aluminum base material 63 whose aluminum (Al) content rate is not more than 99.0 percent by mass is first prepared (see (a) of FIG. 6). In this case, the aluminum base material 63 preferably contains at least one element selected from the group consisting of Mn, Mg, and Fe, and the sum total of content rates of the elements is preferably not less than 1 percent by mass. Note that the aluminum base material 63 can further contain Si.

Next, a surface of the aluminum base material 63 is anodized. This causes the porous alumina layer 62 to be formed on the aluminum layer 61 made of the aluminum base material 63 (see (b) of FIG. 6). A plurality of concave parts are thus formed in the porous alumina layer 62.

Then, the porous alumina layer 62 is caused to contact with an etchant of alumina. This causes the plurality of concave parts, each of which is fine in size, in the porous alumina layer 62 to enlarge in size (in diameter). As a result, concave parts 64 (fine openings, first concave parts), each of which is enlarged in diameter, are thus formed.

The concave parts 64 are formed in a case where (i) aluminum purity of the aluminum base material 63 is not more than 99.0 percent by mass and (ii), particularly, the aluminum base material 63 contains at least one element selected from the group consisting of Mn, Mg and Fe. Note that (a) the number of the concave parts 64 decreases in a case where aluminum purity of the aluminum base material 63 is more than 99.0 percent by mass and (b) the number of the concave parts 64 further decreases in a case where aluminum purity of the aluminum base material 63 is more than 99.5 percent by mass.

Note that (i) the concave parts 64 are formed by the first etching of the porous alumina layer 62, (ii) the number or size of the concave parts 64 hardly change by a plurality of subsequent etching after the first etching, and (iii) the concave parts 64 irregularly distributed.

Thereafter, the anodization and the etching are alternately repeated more than once. This causes a plurality of concave parts 65 (second concave parts), each of which is fine and has a stepwise side wall, to be formed in the porous alumina layer 62. Note that the plurality of concave parts 65 are formed in (i) the entire surface of the aluminum layer 61 and (ii) inner surfaces of the concave parts 64. The concave parts 64 and the plurality of concave parts 65, each of which is different in size, are thus formed in the porous alumina layer 62.

Note that size, generation density, depth and the like of the plurality of concave parts 65 can be controlled by changing, for example, conditions of the anodization such as formation voltage, type and concentration of electrolytic solution, and/ or time period of the anodization.

Furthermore, regularity of arrangement of the plurality of concave parts 65 can be controlled by changing the formation voltage.

For example, the plurality of concave parts 65, which have a high regularity of arrangement, are formed on conditions that the porous alumina layer 62 is subjected to anodization (1) by applying a suitable constant voltage inherent to electrolytic solution and (2) for a long time. Note that combinations of the electrolytic solution and the formation voltage are known as (i) a formation voltage of 28 V for sulfate acid, (ii) a formation voltage of 40 V for oxalic acid, and (iii) a formation voltage of 195 V for phosphoric acid. On the other hand, the plurality of concave parts 65, which have an irregularity of arrangement, are formed on the conditions that (a) the etching and the anodization are alternately repeated and (b) the anodization is carried out in the shortest possible time period, in addition to the above condition (1)

<Example 3 of Production of Base Material 60>

Next, the following description will discuss a further example method for producing a base material 60 in which an aluminum layer 61 is sandwiched between porous alumina layers 62.

Figure 7:
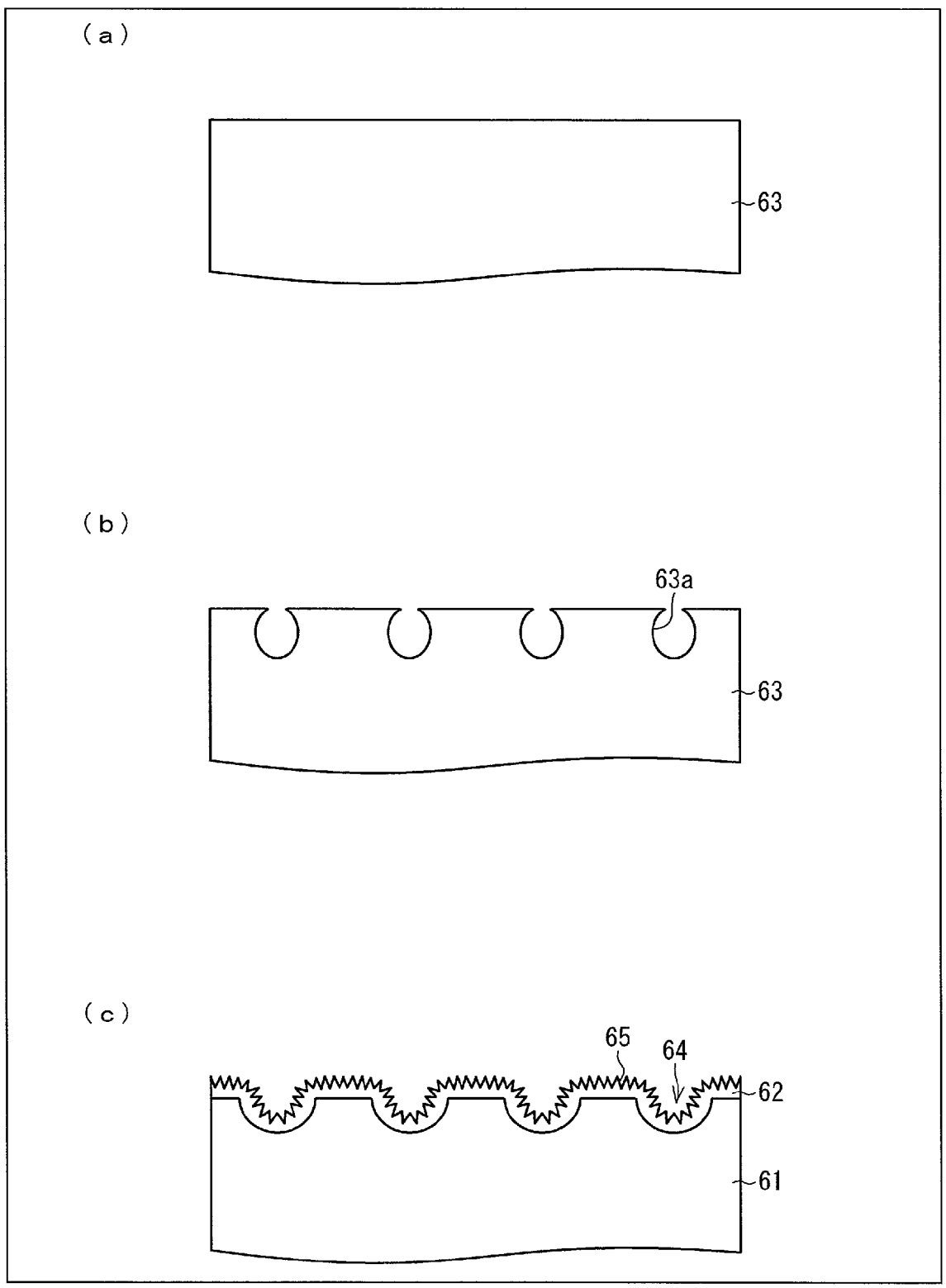
FIG. 7 (a) through (c) of FIG. 7 are cross-sectional views illustrating, in order of step, how to produce a main part of the base material in which the porous alumina layer, having concave parts each of which is different in size, is formed on the aluminum layer.

(a) through (c) of FIG. 7 are cross-sectional views illustrating, in order of step, how to produce a main part of the base material 60 in which the porous alumina layer 62, having the concave parts 64 and 65 each of which is different in size, is formed on the aluminum layer 61.

First, the aluminum base material 63 is prepared (see (a) of FIG. 7). The aluminum base material 63 can include an altered layer.

Note that an aluminum layer (having a thickness of, for example, approximately 0.5 µm to 5 µm) which is supported by a base material such as a glass substrate can be used instead of the aluminum base material 63.

Next, by electrifying, in an aqueous solution, (i) the surface of the aluminum base material 63 or the aluminum layer, which surface serves as a cathode, and (ii) a counter electrode, a plurality of concave parts 63a are formed. Each of the plurality of concave parts 63a has a two-dimensional size of not less than 200 nm and not more than 100 µm by planer view, that is, when viewed in a direction of a normal line of the surface of the aluminum base material 63 (or the aluminum layer) (see (b) of FIG. 7).

An electrolytic solution which is used in anodization can be employed as the aqueous solution (electrolytic solution). Alternatively, water having a resistance of not more than 1 megohm can be employed as the aqueous solution. Note that a temperature of the aqueous solution is not limited to a specific one. In this case, by causing an electric current to fall within a range of DC 1 A/dm$^3$ to 100 A/dm$^3$ and changing a time period of cathode electrolysis, it is possible to form the concave parts 63a each of which has a two-dimensional size of not less than 200 nm and not more than 100 µm.

Note that, by changing conditions of the cathode electrolysis, a fine concavo-convex structure can be formed in which each of concave parts has a two-dimensional size of tens of nanometers as described earlier, or the concave parts 63a can be formed each of which has a two-dimensional size of not less than 200 nm and not more than 100 µm.

An average of distances between neighboring ones of the concave parts 63a can change depending on the conditions of the cathode electrolysis, but is preferably not less than 0.5 μm and not more than 100 μm.

Next, the surface of the aluminum base material 63 (or the aluminum layer) is subjected to anodization (see (c) of FIG. 7). As a result, the porous alumina layer 62 is formed on the surface of the aluminum layer 61 made of the aluminum base material 63. The porous alumina layer 62 has, inside and between a plurality of concave parts 64, a plurality of fine concave parts 65 each of which has a two-dimensional size of not less than 10 nm and not more than 500 nm by planer view.

Then, the porous alumina layer 62 is caused to contact with an etchant. This causes the plurality of fine convex parts 65 to enlarge in size (in diameter).

In such a manner, by alternately repeating the anodization and the etching more than once, it is possible to form the porous alumina layer 62 having the plurality of fine concave parts 65 each of which has a cross section of a desirable shape.

It is preferable to adjust the plurality of fine concave parts 65, by enlarging a diameter of each of the plurality of fine concave parts 65 (by causing each fine concave part 65 to have a cross sectional shape of a substantial cone) by use of the etching, so that each of the plurality of fine concave parts 65 has a two-dimensional size (diameter) of not less than 10 nm but not more than 500 nm, which is substantially equal to a distance between respective neighboring ones of the plurality of fine concave parts 65. As illustrated in (c) of FIG. 7, the plurality of fine concave parts 65 (second concave parts) are formed so as to overlap with the plurality of concave parts 64 (first concave parts) each of which has a two-dimensional size of not less than 200 nm and not more than 100 μm. The porous alumina layer 62 is thus formed.

Conclusion

As has been described, according to Embodiment 1, by forming only the bottom wall 32 of the chassis 31, which bottom wall 32 serves as a heat source holding part, with a material having a high thermal expansion coefficient, it is possible to devise a measure to improve the heat radiation property of the heat source holding part without considering difference in thermal expansion coefficient between the bottom wall 32 of the chassis 31 and the bezel 20 of the holding parts of the display panel 10.

As a result, it is possible to sandwich the display panel 10 between the bezel 20 and the side wall 33 of the chassis 31 which are made of a material having identical thermal expansion coefficients (e.g. SECC) as described earlier. Therefore, even if a temperature of the housings rises, the display panel 10 is not damaged or display quality (optical property) of the display panel 10 does not deteriorate due to a distorted material caused by heat.

Therefore, according to Embodiment 1, it is possible to provide the display device 1 which includes the backlight unit 30 excellent in heat radiation property and which has high display quality. Further, as has been described, by employing, as the bottom wall 32 of the chassis 31, the base material 60 (e.g. an aluminum alloy which has been subjected to alumite treatment) including the aluminum layer 61 sandwiched between the porous alumina layers 62, it is possible to lighten the weight of the display device 1.

Embodiment 2

Figure 8:
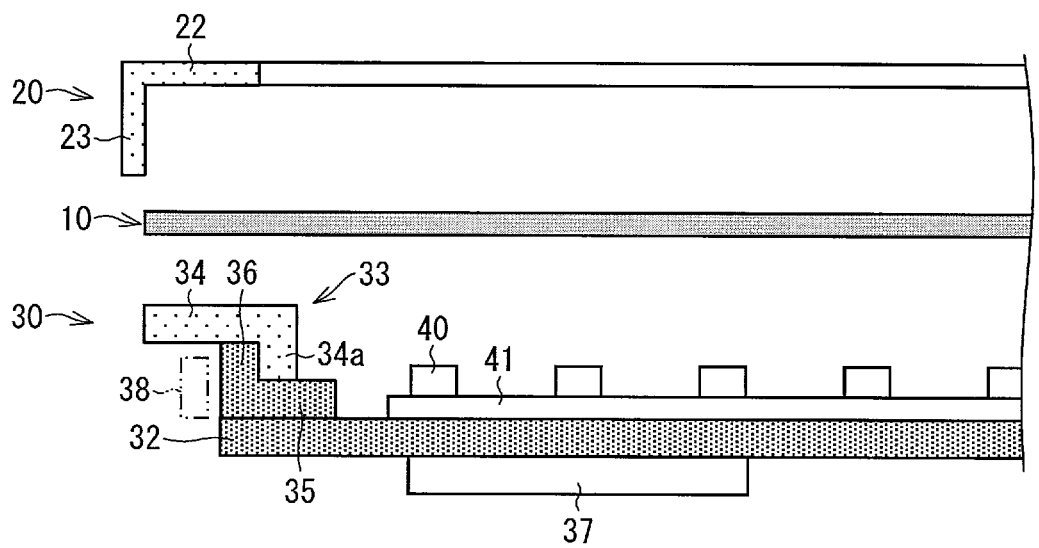
FIG. 8 is an exploded cross-sectional view schematically illustrating a configuration of a main part of a display device in accordance with Embodiment 2 of the present invention.
Figure 9:
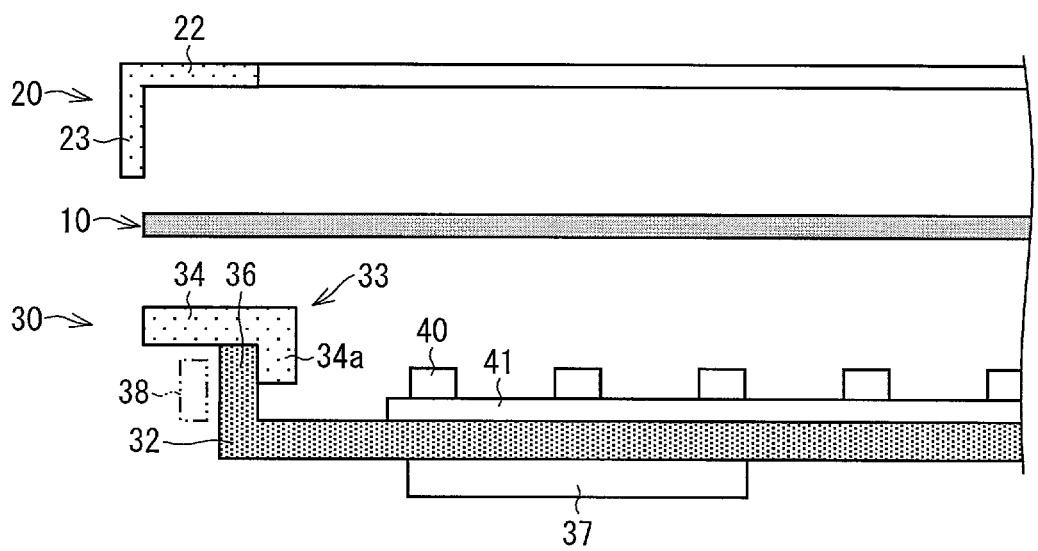
FIG. 9 is an exploded cross-sectional view schematically illustrating a configuration of a main part of another display device in accordance with Embodiment 2 of the present invention.

The following description will discuss, with reference to FIGS. 8 and 9, Embodiment 2 of the present invention. Embodiment 2 will mainly describe differences between Embodiments 1 and 2. Note that, for convenience, identical symbols are given to components having functions identical to those of the components described in Embodiment 1, and their detailed descriptions will not be repeatedly provided.

FIGS. 8 and 9 are exploded cross-sectional views each schematically illustrating a configuration of a main part of a display panel 1 in accordance with Embodiment 2.

An exploded perspective view schematically illustrating a configuration of the display device 1 in accordance with Embodiment 2 is the same as FIG. 1.

The display device 1 in accordance with Embodiment 2 basically has the same structure as the display device 1 in accordance with Embodiment 1, except that the display device 1 in accordance with Embodiment 2 is configured such that only a flange part 34 of a side wall 33 of a chassis 31 is made of a material having a thermal expansion coefficient identical to that of a bezel 20.

According to Embodiment 2, the bezel 20 and the flange part 34 of the side wall 33 of the chassis 31 are made of materials having identical thermal expansion coefficients, and a bottom wall 32 of the chassis 31 and a part of the side wall 33 of the chassis 31 which part is other than the flange part 34 are made of materials having thermal expansion coefficients higher than those of the bezel 20 and the flange part 34 of the side wall 33 of the chassis 31.

Embodiment 2 will describe an example configuration in which (i) the bezel 20 and the flange part 34 of the side wall 33 of the chassis 31 are made of SECC and (ii) the bottom wall 32 of the chassis 31 and a part of the side wall 33 of the chassis 31 which part is other than the flange part 34 are made of an aluminum alloy which has been subjected to alumite treatment.

Embodiment 2 is, however, not limited to such. Alternatively, the bezel 20 and the flange part 34 of the side wall 33 of the chassis 31 can be made of the materials exemplified as the materials of the bezel 20 in Embodiment 1.

Furthermore, the bottom wall 32 of the chassis 31 and a part of the side wall 33 of the chassis 31 which part is other than the flange part 34 can be made of the materials exemplified as the materials of the bottom wall 32 of the chassis 31 in Embodiment 1.

In this case, the flange part 34 of the side wall 33 of the chassis 31 is screwed or joined to a part of the side wall 33 of the chassis 31 which part is other than the flange part 34 so that an optical distance between respective light sources 40 and a display panel 10 does not change, i.e., so that a distance between the respective LED substrates 41 and the display panel 10 does not change.

In this case, for example, the flange part 34 can have an end part from which a connecting part 34a projects for connecting the flange part 34 to a standing part 36 which constitutes a side wall body that extends from edges of the bottom wall 32 so as to surround the bottom wall 32. The connecting part 34a and the standing part 36 can be screwed or joined to each other so that the connecting part 34a and the standing part 36 are connected with each other.

Note that in a case where the bottom wall 32 of the chassis 31 and a part of the side wall 33 of the chassis 31 which part is other than the flange part 34 are made of identical materials, it is not always necessary for the side wall 33 to have a connecting part 35 as illustrated in FIG. 8. In this case, the bottom wall 32 of the chassis 31 and a part of the side wall 33 of the chassis 31 which part is other than the flange part 34 can be integrally formed as illustrated in FIG. 9.

According to Embodiment 2, the bezel 20 and the flange part 34 of the chassis 31, between which the display panel 10 is sandwiched, are made of materials having identical thermal expansion coefficients, with which flange part 34 the display panel 10 is in contact. It is therefore possible to make it difficult for the display panel 10 to be subjected to a distortion or stress even in a case where a temperature of the housings increases.

Furthermore, the bottom wall 32 of the chassis 31, on which bottom wall 32 the light sources 40 and the like each serving as a heat source are provided, is made of a material having a thermal expansion coefficient higher than those of the bezel 20 and the flange part 34 of the chassis 31, as described above. This allows an increase in heat radiation property of the bottom wall 32.

Embodiment 2 can therefore bring about effects similar to those of Embodiment 1.

Note that the aluminum alloy which has been subjected to alumite treatment is rigid enough to hold the display panel 10 and the like via the flange part 34. However, the aluminum alloy has a high thermal expansion coefficient. Therefore, in a case where a temperature of the entire display device 1 rises in response to the light sources 40 turning on, warpage, bending and/or the like may occur in the display device 1, depending on the temperature.

In view of the circumstances, in a case where a material, having a high thermal expansion coefficient, is employed as a part of the side wall 33 which part is other than the flange part 34 as in the present embodiment, a reinforcing member 38 (reinforcing board, brace) can be provided, if necessary, on the side wall 33 of the chassis 31 (see two-dot chain lines in FIGS. 8 and 9). This makes it possible to prevent warpage and/or bending from occurring in the side wall 33 of the chassis 31.

The reinforcing member 38 for reinforcing the side wall 33 of the chassis 31 is thus provided on the side wall 33 of the chassis 31. This allows an increase in strength of the entire chassis 31, and also allows warpage and/or bending of the chassis 31 itself to be to corrected and suppressed, as with a case where the reinforcing member 37 is provided on the bottom wall 32 of the chassis 31.

Note that the reinforce member 38 is not limited to any particular shape, number, and arrangement, provided that the reinforcing member 38 is capable of suppressing warpage and/or bending of the chassis 31 itself.

Embodiment 3

Figure 10:
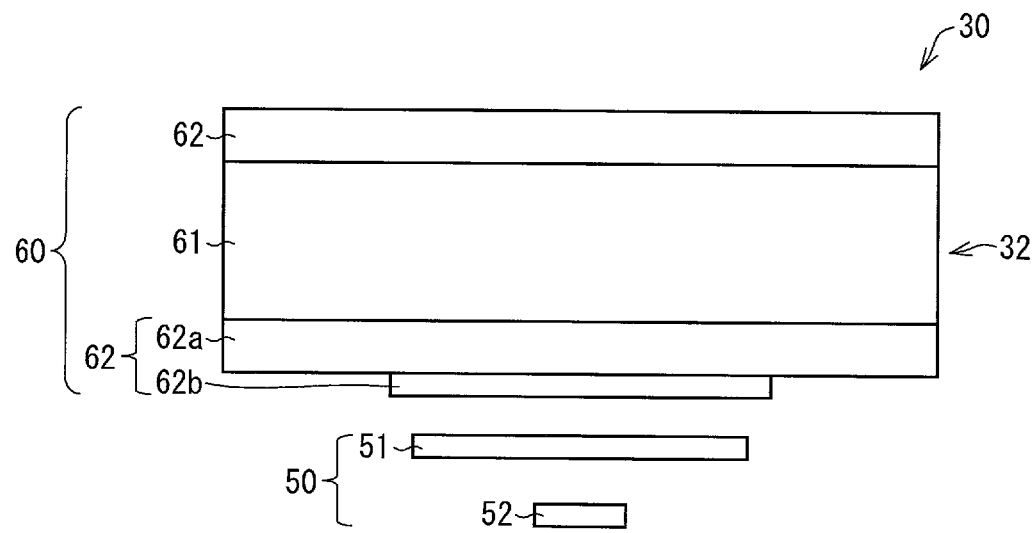
FIG. 10 is an exploded cross-sectional view schematically illustrating a configuration of a main part of a backlight unit of a display device in accordance with Embodiment 3 of the present invention.
Figure 11:
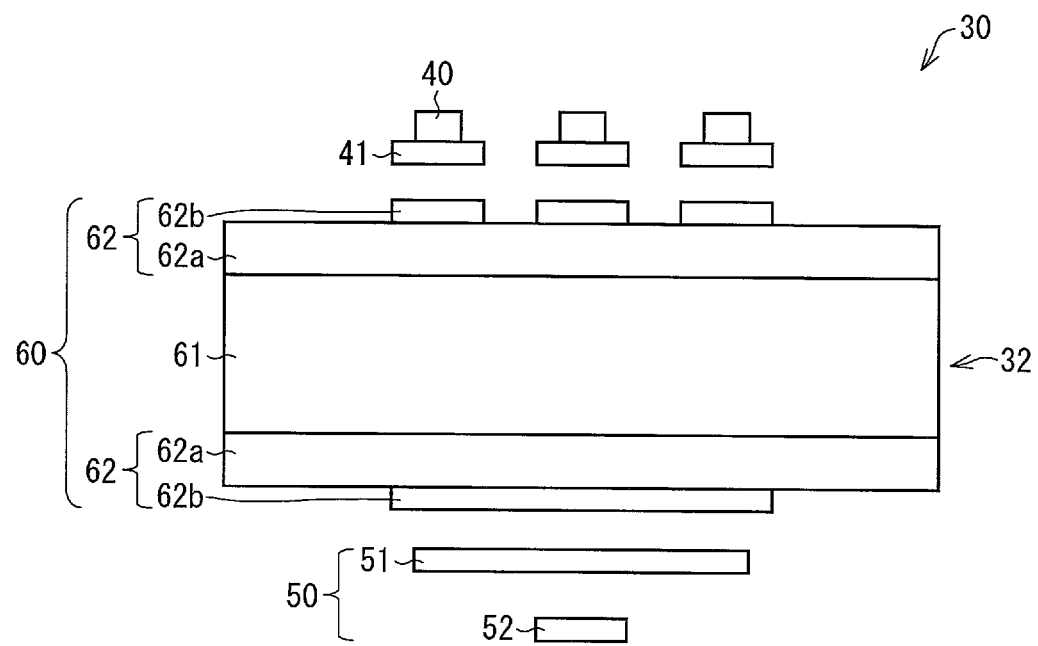
FIG. 11 is an exploded cross-sectional view schematically illustrating a configuration of a main part of a backlight unit of another display device in accordance with Embodiment 3 of the present invention.

The following description will discuss, with reference with FIGS. 10 and 11, Embodiment 3 of the present invention. Embodiment 3 will mainly describe differences between Embodiments 1 through 3. Note that, for convenience, identical symbols are given to components having functions identical to those of the components described in Embodiments 1 and 2, and their detailed descriptions will not be repeatedly provided.

Embodiments 1 and 2 have described an example case where the base material 60, having a uniform thickness, is employed as the bottom wall 32 of the chassis 31.

However, Embodiment 3 is not limited to this. The thickness of a base material 60, more specifically, the thickness of a porous alumina layer 62 can vary from place to place.

<Configuration of Bottom Wall 32>

FIG. 10 is an exploded cross-sectional view schematically illustrating a configuration of a main part of a backlight unit 30 of a display panel 1 in accordance with Embodiment 3.

As illustrated in FIG. 10, according to Embodiment 3, the base material 60, in which the porous alumina layer 62 is partly different in thinness is employed as a bottom wall 32 of a chassis 31.

The backlight unit 30 illustrated in FIG. 10 is configured such that a porous alumina layer 62b is formed in an area of the bottom wall 32 in which area a light source control circuit 51 of a light source driving section 50 is to be provided. That is, a part of the porous alumina layer 62 on a back side of the bottom wall 32 which part corresponds to the light source control circuit 51 of the light source driving section 50 is made thicker than the other part of the porous alumina layer 62.

<Method for Forming Bottom Wall 32>

A method for forming the bottom wall 32 of the chassis 31 with the use of the base material 60 will be described below.

The porous alumina layer 62a is first formed on an entire surface of an aluminum layer 61 made of an aluminum base material, for example, by immersing the entire aluminum base material in an electrolytic solution so that the aluminum base material is subjected to anodization.

Next, a surface of the aluminum base material, on which surface the porous alumina layer 62a is formed, is partly masked with a protective film. The aluminum base material thus masked is immersed in the electrolytic solution so as to be partly subjected to anodization. As a result, the porous alumina layer 62b is partly formed. Note that a film which is high in anti-acidity is employed as the protective film. Thereafter, the porous alumina layer 62b is subjected to sealing if necessary.

The volume of the porous alumina layer 62 expands and increases by the anodization. Therefore, a part of the porous alumina layer 62 which part is immersed for a longer time in total becomes thicker than a part of the porous alumina layer 62 which part is immersed for a shorter time in total. As a result, the porous alumina layer 62 which is partly different in thickness is formed as illustrated in FIG. 10.

In the bottom wall 32 of the chassis 31, an area of the porous alumina layer 62 which area is particularly required to have heat radiation property is thus made thick. This allows an increase in the heat radiation property. Furthermore, the porous alumina layer 62b is partly provided, that is, the porous alumina layer 62 partly varies in thickness on the back side of the bottom wall 32 of the chassis 31. This allows an increase in surface area of the porous alumina layer 62, and ultimately allows an improvement in heat radiation property.

The porous alumina layer 62 thus partly varies in thickness on the back side of the bottom wall 32 of the chassis 31. This causes a distance between respective LED substrates 41 and a display panel 10 (in other words, a distance between respective light sources 40 and the display panel 10) remains unchanged. It is therefore possible to maintain a given optical distance.

<Modification>

Note that the configuration illustrated in FIG. 10 has described an example in which the porous alumina layer 62b is formed only in the area of the bottom wall 32 of the chassis 31 in which area the light source control circuit 51 of the light source driving section 50 is to be provided. However, Embodiment 3 is, however, not limited to such.

FIG. 11 is an exploded cross-sectional view schematically illustrating a configuration of a main part of the backlight unit 30 of the display device 1 in accordance with Embodiment 3.

According to the backlight unit 30 illustrated in FIG. 11, porous alumina layers 62b are formed in (i) an area of the bottom wall 32 which area corresponds to an area where the light source control circuit 51 of the light source driving section 50 is to be provided and (ii) areas of the bottom wall 32 which areas correspond to areas where the respective LED base materials 41 are to be provided. That is, (i) a part of the porous alumina layer 62 on the back side of the bottom wall 32 which part corresponds to the light source control circuit 51 of the light source driving section 50 and (ii) parts of the porous alumina layer 62 on a front side of the bottom wall 32 which parts correspond to the LED respective substrates 41, are made thicker than the other parts of the porous alumina layers 62.

This allows heat generated in the light source driving section 50 and the LED substrates 41 to be efficiently radiated outside. It is therefore possible to ensure more stable operation.

Embodiment 4

Figure 12:
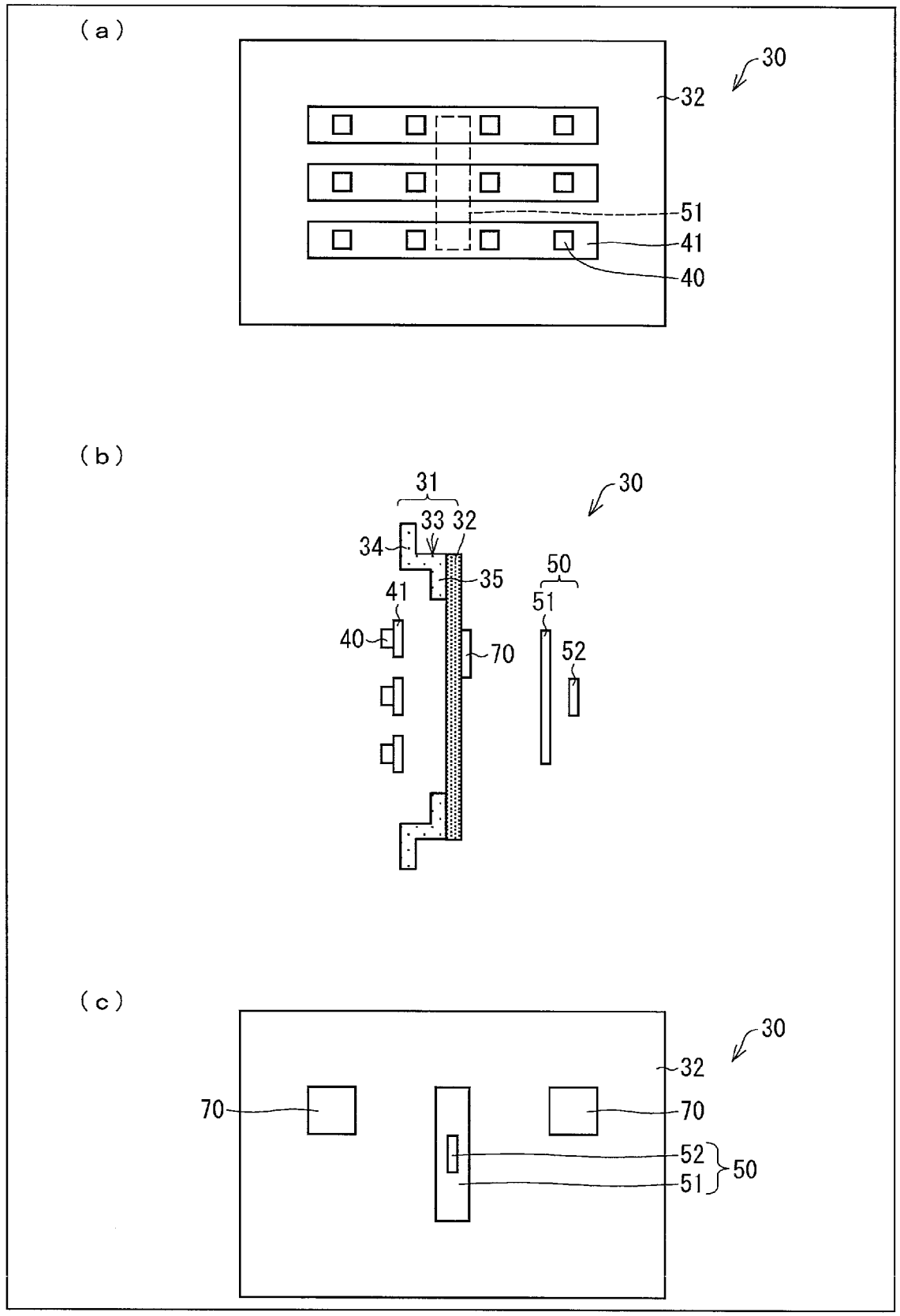
FIG. 12 (a) through (c) of FIG. 12 are views each schematically illustrating a configuration of a main part of a backlight unit in accordance with Embodiment 4 of the present invention. (a) of FIG. 12 is a plan view, (b) of FIG. 12 is an exploded cross-sectional view, and (c) of FIG. 12 is a bottom view.

The following description discusses, with reference to (a) through (c) of FIG. 12, Embodiment 4 of the present invention. Embodiment 4 will mainly describe differences between Embodiments 1 through 4. Note that, for convenience, identical symbols are given to components having functions identical to those of the components described in Embodiments 1 through 3, and their detailed descriptions will not be repeatedly provided.

(a) of FIG. 12 is a plan view schematically illustrating a configuration of a main part of a backlight unit 30. (b) of FIG. 12 is an exploded cross-sectional view schematically illustrating the configuration of the main part of the backlight unit 30. (c) of FIG. 12 is a bottom view schematically illustrating the configuration of the main part of the backlight unit 30.

Note in (a) of FIG. 12 that, for convenience, (i) a side wall 33 and a reinforcing member 37 of the backlight unit 30 are not illustrated and (ii) light sources 40 are partly illustrated.

As illustrated in (b) and (c) of FIG. 12, a display device in accordance with Embodiment 4 has a configuration similar to that of the display device 1 in accordance with Embodiment 1, except that the backlight unit 30 includes at least one fan 70 on an outer surface (back surface) of the bottom wall 32 of the chassis 31, i.e., on a back surface side of the chassis 31. The at least one fan 70 is provided on the outer surface side of the bottom wall 32 of the chassis 31 so as to be substantially perpendicular to a direction in which a normal line of the bottom wall 32 extends.

A heat-exhausting fan, a blower fan, or both of the heat-exhausting fan and the blower fan can be employed as the at least one fan 70.

Note that (c) of FIG. 12 illustrates the backlight unit 30 including two fans 70. Note that the number of fans 70 can be one or three or more, instead of two.

As described earlier, operation of a light source driving section and light sources such as LEDs can become unstable due to generated heat. Particularly, in a case where a display device such as a liquid crystal display device is employed as a display section of a digital signage (especially, a large outdoor digital signage), a large electric current passes through light sources and light source driving section. This easily causes unstable operation of the light sources and the light source driving section.

In contrast, according to Embodiment 4, heat which is generated by the light sources 40, the light source driving section 50 and the like is efficiently exhausted by the fans 70 outside from the bottom wall 32 of the chassis 31. This allows the operation of the light sources 40 and the light source driving section 50 to stably operate.

<Summary>

As has been described, a display device in accordance with each of the embodiments described above includes: (I) a non-luminous display panel for displaying an image; (II) a backlight unit, provided on a back side of the display panel, which includes (i) a chassis, with a box shape, having a bottom wall and a side wall and (ii) a light source, provided on the bottom wall of the chassis, for irradiating the display panel with light; and (III) a bezel, provided on a front side of the display panel, which has a frame shape, the display panel being sandwiched between the chassis and the bezel, the bezel and a contact part of the chassis, which contact part is in contact with the display panel, being made of materials having identical thermal expansion coefficients, the bottom wall of the chassis being made of a material having a thermal expansion coefficient higher than those of the bezel and the contact part.

In such a manner, because the bezel and the contact part of the chassis, which contact part is in contact with the display panel are made of materials having identical thermal expansion coefficients, it is possible to cause the bezel and the contact part of the chassis which contact part is in contact with the display panel to function to protect the display panel so as to prevent the display panel from being damaged.

On the other hand, because the bottom wall of the chassis, where heat sources such as the light sources and the like are provided, is made of a material having a thermal expansion coefficient higher than those of the bezel and the contact part of the chassis which contact part is in contact with the display panel, it is possible to cause the bottom wall of the chassis to function to increase a heat radiation property so as to efficiently radiate heat generated by such heat sources.

Therefore, it is possible to hold and protect the display panel while increasing the heat dissipation property.

Further, because the bottom wall of the chassis and the contact part of the chassis which contact part is in contact with the display panel are made of different materials, it is possible to suppress occurrence of uneven luminance.

Further, because the bezel and the contact part of the chassis which contact part is in contact with the display panel are made of materials having identical thermal expansion coefficients, display quality does not deteriorate.

Further, according to the above configuration, because the chassis is formed in a box-shape and has a side wall as described above, external light does not enter the display panel through a back surface or a periphery of the chassis. This allows deterioration in display quality to be suppressed.

Therefore, according to the above configuration, it is possible to increase the heat radiation property of the backlight unit and provide the display device having high display quality.

The bezel and the chassis are preferably made of respective metallic materials.

In recent years, an entire display device has been required to be thinner and lighter in weight as a display panel becomes larger. Because the bezel and the chassis are made of respective metallic materials, it is possible to secure sufficient light-shielding property and sufficient strength even in a case where the display device is thinned.

The bottom wall of the chassis is preferably made of a material having a thermal expansion coefficient higher than that of iron. That is, the display device is preferably configured such that the bottom wall of the chassis is made of a material having a thermal expansion coefficient higher than that of iron, and the bezel and the contact part of the chassis which contact part is in contact with the display panel are made of materials having lower thermal expansion coefficients not higher than that of iron.

According to the above configuration, it is possible to hold and protect the display panel, while increasing the heat radiation property as compared with conventional cases.

Further, the bezel is preferably made of iron or iron alloy.

Iron and iron alloy are preferable as materials of the bezel and the contact part of the chassis which contact part is in contact with the display panel because (i) they have high specific tensile strength, (ii) then can be molded by press work, and (iii) they have high productivity.

Further, the bezel is preferably made of cold-rolled steel.

Among iron alloy, particularly, cold-rolled steel is highly rigid and excellent in press workability. Therefore, cold-rolled steel is particularly preferable as materials of the bezel and the contact part of the chassis which contact part is in contact with the display panel.

Further, it is preferable that the side wall of the chassis have a flange part on its one end so that the flange part projects in parallel to the display panel and supports back side edges of the display panel, the bezel and at least the flange part of the side wall of the chassis are made of materials having identical thermal expansion coefficients, and the bottom wall of the chassis is made of a material having a thermal expansion coefficient higher than those of the bezel and at least the flange part of the side wall of the chassis.

According to the above configuration, the side wall of the chassis has the flange part. The display device is configured such that the display panel is sandwiched between the flange part and the bezel.

Therefore, because the bezel and at least the flange part of the side wall of the chassis are made of materials having identical thermal expansion coefficients and the bottom wall of the chassis is made of a material having a thermal expansion coefficient higher than those of the bezel and the at least the flange part of the side wall of the chassis, it is possible to hold and protect the display panel while increasing the heat radiation property, and possible to provide the display panel having high display quality, as described above.

Further, by sandwiching the display panel between the flange part and the bezel, it is possible to stably hold the display panel.

Further, the display device is preferably arranged such that the bezel and the side wall of the chassis are made of materials having identical thermal expansion coefficients, and the bottom wall of the chassis is made of a material having a thermal expansion coefficient higher than those of the bezel and the side wall of the chassis.

This allows an increase in holding strength of the display panel.

Further, the bottom wall of the chassis is preferably made of aluminum or aluminum alloy.

Aluminum and aluminum alloy are lightweight and inexpensive. In addition, aluminum and aluminum alloy have thermal expansion coefficients two times higher than that of iron, and particularly excel in heat radiation property.

Further, the bottom wall of the chassis is preferably made of a base material including, on a surface of an aluminum layer, a porous alumina layer or a porous alumina layer which has been subjected to sealing.

According to the above configuration, heat, generated from the heat sources such as the light sources provided on the bottom wall of the chassis and transferred to the bottom wall of the chassis, is efficiently transferred to the entire aluminum layer because the aluminum layer is high in thermal conductivity, and is then efficiently radiated outside by the porous alumina layer which is high in heat radiation.

Therefore, according to the above configuration, it is possible to efficiently radiate heat generated from the heat sources outside. This allows stable operation to be ensured.

Further, the base material is preferably made of an aluminum alloy which has been subjected to alumite treatment.

The aluminum alloy which has been subjected to alumite treatment is lighter in weight than iron and is excellent in heat radiation property, while having significantly high hardness. Therefore, use of the aluminum alloy which has been subjected to alumite treatment allows an improvement in heat radiation property and a reduction in weight of the display device simultaneously. As the display panel becomes larger, a greater effect is brought about.

Further, it is preferable that a porous alumina layer on a back side of the bottom wall of the chassis partly vary in thickness.

This configuration allows an increase in surface area of the porous alumina layer, and ultimately allows an improvement in heat radiation property.

Further, the porous alumina layer of the bottom wall of the chassis, where heat sources such as the light sources and the like are provided, partly varies in thickness. This allows heat generated from the heat sources to be more efficiently radiated outside. Therefore, it is possible to secure stable operation more surely.

Further, according to the above configuration, because the porous alumina layer on the back side of the bottom wall of the chassis partly varies in thickness, a distance between the respective light sources and the display panel remains unchanged. It is therefore possible to maintain a given optical distance.

It is preferable that a reinforcing member for reinforcing the bottom wall of the chassis be provided on a back surface of the bottom wall of the chassis.

It is possible to increase a strength of the bottom wall by providing, on the back surface of the bottom wall of the chassis, the reinforcing member. This allows an increase in strength of the chassis, and also allows warpage and/or bending of the chassis itself to be corrected or suppressed.

Further, it is preferable that at least one of a blower fan and a heat-exhausting fan be provided on the back surface of the bottom wall of the chassis.

Heat generated by the heat sources such as the light sources provided on the bottom all of the chassis is efficiently exhausted outside from the bottom wall of the chassis by the blower fan or the heat-exhausting fan. This allows operation of the heat sources such as the light sources to stably operate.

Further, the display device can be preferably employed as a display device of a digital signage.

In a case where a display device is employed as a digital signage which stays out in the sun, it is necessary for a backlight unit to emit light having a sufficiently high luminance of level so that visible display is carried out. Therefore, in a case where a display device is employed as a display section of a digital signage, especially, a large outdoor digital signage, a large electric current passes through light sources and a light source driving section.

According to the above configuration, because the bottom wall of the chassis is made of a material having a high heat radiation property, it is possible to provide the display device which is excellent in heat radiation property. Therefore, the display device can be preferably employed as a display device of a digital signage.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is preferably applicable to a display device employed as a display of a digital signage.

REFERENCE SIGNS LIST

1 Display device
2 Display panel
3 Backlight unit
10 Display panel
10a Short side
10b Long side
20 Bezel
21 Opening
22 Top wall
23 Side wall
30 Backlight unit
31 Chassis
32 Bottom wall
33 Side wall
34 Flange part
34a Connecting part
35 Connecting part
36 Standing part
37 Reinforcing member
38 Reinforcing member
40 Light source
41 LED substrate (light source holding member)
42 Connecting part
43 Wiring
44 Insulating sheet
50 Light source driving section
51 Light source control circuit
52 Light source control substrate
60 Base material
61 Aluminum layer
62 Porous alumina layer
62a Porous alumina layer
62b Porous alumina layer
63 Aluminum base material
64 Concave part
65 Concave part
70 Fan

The invention claimed is:

1. A display device comprising:
a non-luminous display panel for displaying an image;
a backlight unit, provided on a back side of the display panel, which includes (i) a chassis, with a box shape, having a bottom wall and a side wall and (ii) a light source, provided on the bottom wall of the chassis, for irradiating the display panel with light; and
a bezel, provided on a front side of the display panel, which has a frame shape,
the display panel being sandwiched between the chassis and the bezel,
the bezel and a contact part of the chassis, which contact part is in contact with the display panel, being made of materials having identical thermal expansion coefficients,
the bottom wall of the chassis being made of a material having a thermal expansion coefficient higher than those of the bezel and the contact part.

2. The display device as set forth in claim 1, wherein the bezel and the chassis are made of respective metallic materials.

3. The display device as set forth in claim 1, wherein the bottom wall of the chassis is made of a material having a thermal expansion coefficient higher than that of iron.

4. The display device as set forth in claim 2, wherein the bezel is made of iron or iron alloy.

5. The display device as set forth in claim 4, wherein the bezel is made of cold-rolled steel.

6. The display device as set forth in claim 1, wherein
the side wall of the chassis has a flange part on its one end so that the flange part projects in parallel to the display panel and supports back side edges of the display panel,
the bezel and at least the flange part of the side wall of the chassis are made of materials having identical thermal expansion coefficients, and
the bottom wall of the chassis is made of a material having a thermal expansion coefficient higher than those of the bezel and at least the flange part of the side wall of the chassis.

7. The display device as set forth in claim 1, wherein
the bezel and the side wall of the chassis are made of materials having identical thermal expansion coefficients, and
the bottom wall of the chassis is made of a material having a thermal expansion coefficient higher than those of the bezel and the side wall of the chassis.

8. The display device as set forth in claim 1, wherein the bottom wall of the chassis is made of aluminum or aluminum alloy.

9. The display device as set forth in claim 8, wherein the bottom wall of the chassis is made of a base material including, on a surface of an aluminum layer, a porous alumina layer or a porous alumina layer which has been subjected to sealing.

10. The display device as set forth in claim 9, wherein the base material is made of an aluminum alloy which has been subjected to alumite treatment.

11. The display device as set forth in claim 9, wherein a porous alumina layer on a back side of the bottom wall of the chassis partly varies in thickness.

12. The display device as set forth in claim 1, wherein a reinforcing member for reinforcing the bottom wall of the chassis is provided on a back surface side of the bottom wall of the chassis.

13. The display device as set forth in claim 1, wherein at least one of a blower fan and a heat-exhausting fan is provided on the back surface side of the bottom wall of the chassis.

14. The display device as set forth in claim 1, wherein the display device is a display device for use in a digital signage.

* * * * *